(12) United States Patent
Huang et al.

(10) Patent No.: US 10,991,258 B2
(45) Date of Patent: Apr. 27, 2021

(54) REAL-TIME LEARNING AND DETECTION OF A BORDER IN A FLIGHT PATH

(71) Applicant: Suzhou Eavision Robotic Technologies Co., Ltd., Jiangsu Province (CN)

(72) Inventors: Jihua Huang, Dublin, CA (US); Han-Shue Tan, Concord, CA (US); SweKuang Tan, Castro Valley, CA (US)

(73) Assignee: Suzhou Eavision Robotic Technologies Co., Ltd.

(*) Notice: Subject to any disclaimer, the term of this patent is extended or adjusted under 35 U.S.C. 154(b) by 294 days.

(21) Appl. No.: 15/953,254

(22) Filed: Apr. 13, 2018

(65) Prior Publication Data

US 2019/0318633 A1   Oct. 17, 2019

(51) Int. Cl.
 *G08G 5/00* (2006.01)
 *G06N 20/00* (2019.01)

(52) U.S. Cl.
 CPC ............. *G08G 5/006* (2013.01); *G06N 20/00* (2019.01); *G08G 5/0073* (2013.01)

(58) Field of Classification Search
 CPC ....... G08G 5/006; G08G 5/0073; G06N 20/00
 USPC .......................................................... 701/3
 See application file for complete search history.

(56) References Cited

U.S. PATENT DOCUMENTS

| | | | |
|---|---|---|---|
| 7,359,555 B2 * | 4/2008 | Porikli | G03B 15/006 382/204 |
| 7,363,157 B1 * | 4/2008 | Hanna | G01C 11/00 702/5 |
| 7,668,625 B2 * | 2/2010 | Bitar | G09B 29/10 701/1 |
| 8,032,266 B2 * | 10/2011 | Bitar | G01S 13/935 701/3 |
| 8,060,352 B2 * | 11/2011 | Kelley | G06T 17/05 382/109 |
| 8,433,457 B2 * | 4/2013 | Garceau | G06T 7/001 700/1 |
| 9,074,848 B1 * | 7/2015 | Hunter, Jr. | F41G 7/343 |
| 9,483,816 B2 * | 11/2016 | Smith | G06T 7/00 |
| 9,639,960 B1 * | 5/2017 | Loveland | G01C 11/02 |
| 9,903,719 B2 * | 2/2018 | Hunter, Jr. | G06T 7/74 |
| 10,012,735 B1 * | 7/2018 | Loveland | G01S 19/40 |
| 10,438,495 B1 * | 10/2019 | Robertson | G06F 16/248 |
| 2007/0162193 A1 * | 7/2007 | Garceau | G01C 11/02 701/3 |
| 2010/0215212 A1 * | 8/2010 | Flakes, Jr. | G01M 5/0025 382/100 |
| 2014/0303814 A1 * | 10/2014 | Burema | B64D 1/16 701/3 |
| 2016/0246304 A1 * | 8/2016 | Canoy | G05D 1/0858 |

(Continued)

*Primary Examiner* — Joshua E Rodden
(74) *Attorney, Agent, or Firm* — Van Pelt, Yi & James LLP

(57) ABSTRACT

A specification of an expected border of a bounded area is received. One or more images of at least a portion of the bounded area that is at least a threshold distance away from the expected border are received to generate a model of the bounded area. A current location position of the aerial vehicle is used to determine that the aerial vehicle is within the threshold distance away from the expected border. In response, an updated expected border is determined using the generated model of the bounded area and a border image of at least a portion of the expected border captured by an image sensor.

20 Claims, 16 Drawing Sheets

(56) References Cited

U.S. PATENT DOCUMENTS

| | | | |
|---|---|---|---|
| 2016/0253808 A1* | 9/2016 | Metzler | G05D 1/0094 |
| | | | 382/103 |
| 2017/0334559 A1* | 11/2017 | Bouffard | B64C 39/024 |
| 2017/0337824 A1* | 11/2017 | Chen | G08G 5/0086 |
| 2019/0130182 A1* | 5/2019 | Zang | G06K 9/00651 |
| 2019/0205609 A1* | 7/2019 | Taveira | G06K 9/0063 |
| 2020/0066164 A1* | 2/2020 | Robertson | G05D 1/102 |

* cited by examiner

REAL-TIME LEARNING AND DETECTION OF A BORDER IN A FLIGHT PATH

BACKGROUND OF THE INVENTION

Harvesting crops manually is a labor-intensive activity, in particular, the application of pesticides/fertilizers. Due to public concern in regards to the release of chemicals into the environment and human exposure to chemicals, the utilization of unmanned aerial vehicles (UAV) has become an emerging trend for spraying pesticide/fertilizer. Employing operators to remotely control UAVs, however is still labor-intensive and requires long periods of high-concentration to detail and attention. In accordance, the utilization of autonomous UAVs to perform the application of pesticides/fertilizers eradicates the need for high levels of alertness and labor otherwise necessary for the operator. Autonomous UAVs are able to fly according to an assigned route without the manual operation carried out by personnel controlling the UAV, thus increasing the potential to reduce labor while increasing efficiency and effectiveness.

It is commonplace for autonomous UAVs to be equipped with a positioning system, such as a Global Positioning System (GPS) that provides the position of the UAV; a communication module that receives an assigned route; and a control module that directs the UAV to automatically follow the assigned route. Typically, such a route is generated based on a field defined by an operator or a user. For example, an operator could define the field by locating the boundary of the field on a digital map; a route-generating software routine extracts the boundary information from the digital map and plans a route to cover the given field. The planned route is then communicated to the autonomous UAV, which follows the route to spray the whole field.

One critical requirement for pesticide/fertilizer applications is to ensure the pesticides/fertilizers are sprayed uniformly and completely on a given field, which entails covering the entire specified field without missing any corners, crevices, or bounded areas (e.g., boundary areas). Moreover, the pesticides/fertilizers must not be sprayed outside the given parameters of the field, since there may be other crops, waterways, or roads adjacent to the specified field. However, the mentioned method above of defining a field by locating the boundary of the field in a digital map leaves much to be desired for an alternative improved method. The boundary information from the digital map can easily have position errors ranging from three to six meters, and such errors are directly propagated to the planned route. As a result, the UAV may not cover the areas within three to six meters from a border of the field or cover beyond a border by three to six meters. Both situations fail to meet the critical requirement of pesticide/fertilizer application and should therefore be alleviated or eliminated.

One possible rectification is to utilize survey technologies to accurately survey the boundary of the field. Accurate survey technologies can reduce the position error to the nearest centimeter, greatly reducing the position errors in the boundary information of the field. The resulting route can then cover the whole field with the same centimeter level of accuracy. However, this manner of identifying the borders of a given field requires time-inefficient and labor-intensive survey mechanisms of demanding the operator to physically go to each field to conduct the survey. Moreover, the positioning system onboard the UAV also has position errors. As a result, the on-board positioning system may indicate that the UAV has reached the boundary while the UAV is still far away from the border or has already passed it. Although high-end positioning systems can be used on the UAV to achieve accurate positions, such systems are often expensive and the process is often labor intensive and thus further increases the cost of pesticide/fertilizer application by autonomous UAVs. In addition, such high-end position systems are still vulnerable to disturbances such as blockage and multipath.

BRIEF DESCRIPTION OF THE DRAWINGS

Various embodiments of the invention are disclosed in the following detailed description and the accompanying drawings.

DETAILED DESCRIPTION

Figure 1:
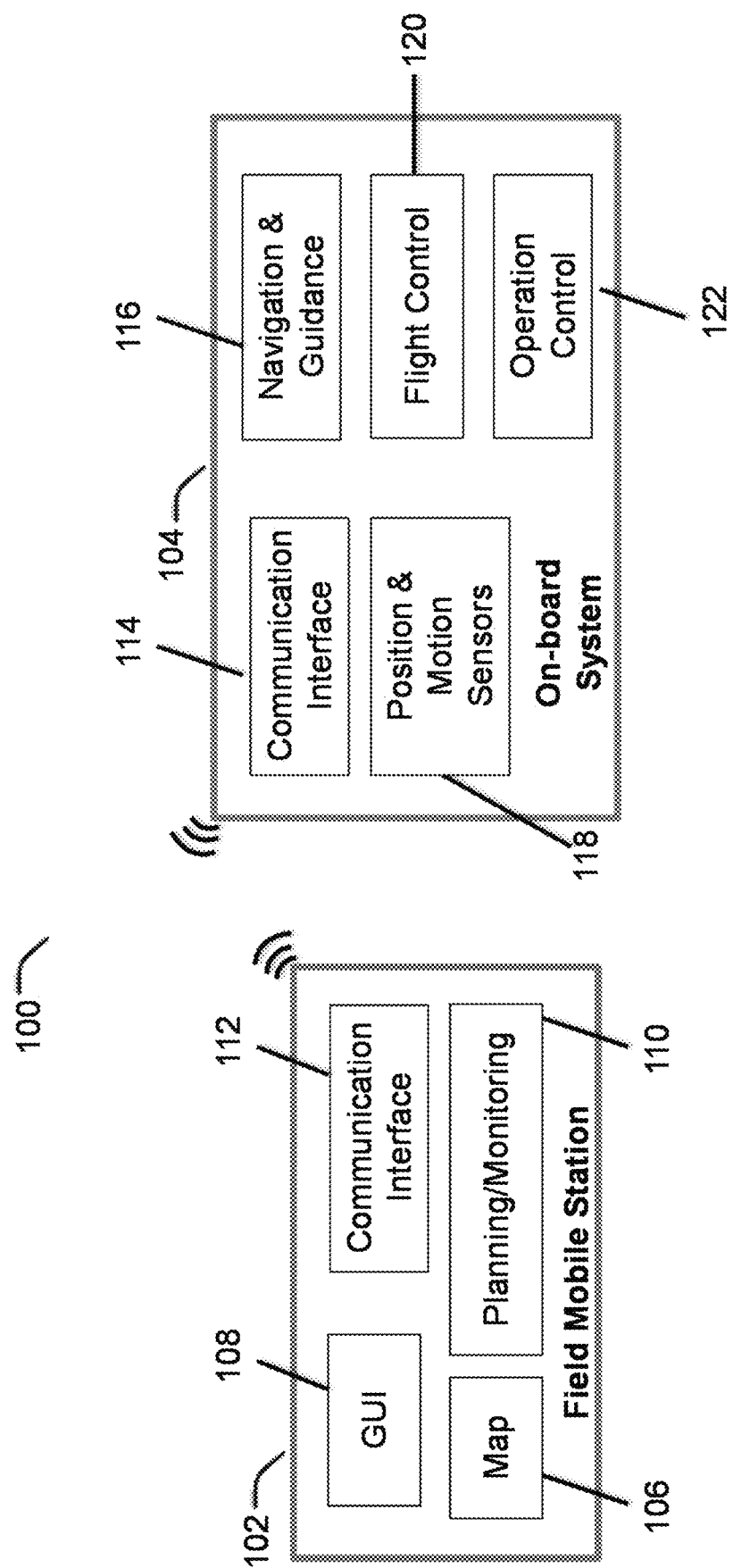
FIG. 1 is a block diagram illustrating an embodiment of aerial vehicle system environment components.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling an aerial vehicle (e.g., UAV, multirotor aircraft, drone, airplane, helicopter, or any other flying vehicle) is disclosed. For example, during flight of the aerial vehicle, images captured by the aerial vehicle are used in real time to learn about characteristics of a desired bounded flight area and predict edges of the desired bounded flight area to adjust the flight path of the aerial vehicle. In some embodiments, the aerial vehicle includes an image sensor configured to acquire an image of a surface below and/or in front of the aerial vehicle and a position sensor (e.g., GPS sensor) configured to at least in part detect a current position of the aerial vehicle. An initial identification of an expected border of a bounded area is received. For example, the bounded area includes an agricultural field (e.g., crop field, vineyard, orchard, etc.) to be autonomously sprayed using the aerial vehicle and the identification of the expected border specifies approximate boundaries of the agricultural field. Using a plurality of images captured by the image sensor of at least a portion of the bounded area that is at least a threshold distance away from the expected border, a model of the bounded area is generated. For example, by using images known to be of the agricultural field given its distance away from the expected border of the agricultural field, the model of the agricultural field is generated. This model can be used to detect likely boundaries of a bounded area and adjust the expected border of the bounded area in real-time to aid in adjusting a flight path of the aerial vehicle (e.g., to allow the aerial vehicle to better cover the entire bounded area when crop dusting the bounded area). For example, when the aerial vehicle is within the threshold distance away from the expected border (e.g., allowing the camera to capture at least a portion of the expected border), the model can be used to detect a predicted border portion (e.g., using machine learning prediction) and use the predicted border portion to update and correct the previously expected border. The updated border can then be used in navigating the aerial vehicle over the bounded area.

FIG. 1 is a block diagram illustrating an embodiment of aerial vehicle system environment components. This aerial vehicle system may be utilized in an autonomous fertilizer/pesticide application over a desired area (e.g., over an agricultural field).

The system 100 at least comprises a field mobile station 102 and an aerial vehicle on-board system 104. The field mobile station 102 may include a digital map module 106, a graphic user interface (GUI) 108, a planning/monitoring module 110, and a communication interface 112. The aerial vehicle on-board system 104 may include a communication interface 114, a navigation and guidance module 116, a position and motion sensors module 118, a flight control module 120, and an operation control module 122. Aerial vehicle on-board system 104 is included in an aerial vehicle and can be utilized to control the aerial vehicle. The aerial vehicle in various embodiments includes other components such as a power source (e.g., battery), motors, propellers, other sensors, chemical tank, sprayer, etc.

The field mobile station 102 may be implemented on any computing device such as a phone, a tablet, a controller, a laptop computer, a desktop computer, or a handheld computer. For example, field mobile station 102 can be carried by an operator onsite where an aerial vehicle is to be flown to configure, plan (e.g., generate a flight plan), and/or control flight and operation of the aerial vehicle. The digital map module 106 provides map information and the graphic user interface (GUI) 108 provides an interface to be utilized by the operator to configure, plan, and control the aerial vehicle operation. For example, the operator utilizes GUI 108 to configure, plan, and execute the application of fertilizer/pesticide by the aerial vehicle. In some embodiments, information regarding a specified area of flight and/or application of the aerial vehicle is provided to the planning/monitoring module 110. The planning/monitoring module 110 generates, optimizes, and plans a flight route to cover the specified area (e.g., to cover area with fertilizer/pesticide sprayed by the aerial vehicle). Once the flight route has been calculated, field mobile station 102 sends the planned flight route information to the aerial vehicle on-board system 104 via its communication interface 112 (e.g., wireless data communication interface).

The communication interface 114 receives the planned flight route information sent via the communication interface 112 of the field mobile station 102. This received planned flight route information is then provided to the navigation and guidance module 116. In addition, the position and motion sensors 118 measure the aerial vehicle's current state information including the current position, height in relation to the crop/ground, motion information of the aerial vehicle's velocity, and orientation angles (e.g., yaw, pitch, and roll angles). The position and motion sensors 118 then send the aerial vehicle's current state measurements to both the navigation and guidance module 116 and the flight control module 120.

The navigation and guidance module 116 uses the planned flight route information and information from the position and motion sensors 118 to determine the aerial vehicle's position deviation from the flight route and regulates the aerial vehicle's flight actions to guide the aerial vehicle in adherence to the designated route. The flight control module 120 executes the flight actions by determining and communicating commands to the motors of the aerial vehicle. The operation control module 122, a component of the aerial vehicle on-board system 104, controls a pump onboard the aerial vehicle that regulates fertilizer/pesticide spray and activates spraying in accordance to the planned flight route.

The on-board system 104 may report the aerial vehicle's current status to the field mobile station 102 via its communication interface 114. The field mobile station 102 receives the aerial vehicle status through its communication interface 112 and displays status information to the operator via the GUI 108 (e.g., allowing the operator to monitor the aerial vehicle and fertilizer/pesticide dissemination).

The system 100 may be used for other purposes not limited to fertilizer/pesticide application. For example, instead of controlling a pump, the operational control module 122 may operate an imaging device that has been installed on the aerial vehicle in order to capture images of crops for the purpose of growth inspection and monitoring.

Figure 2:
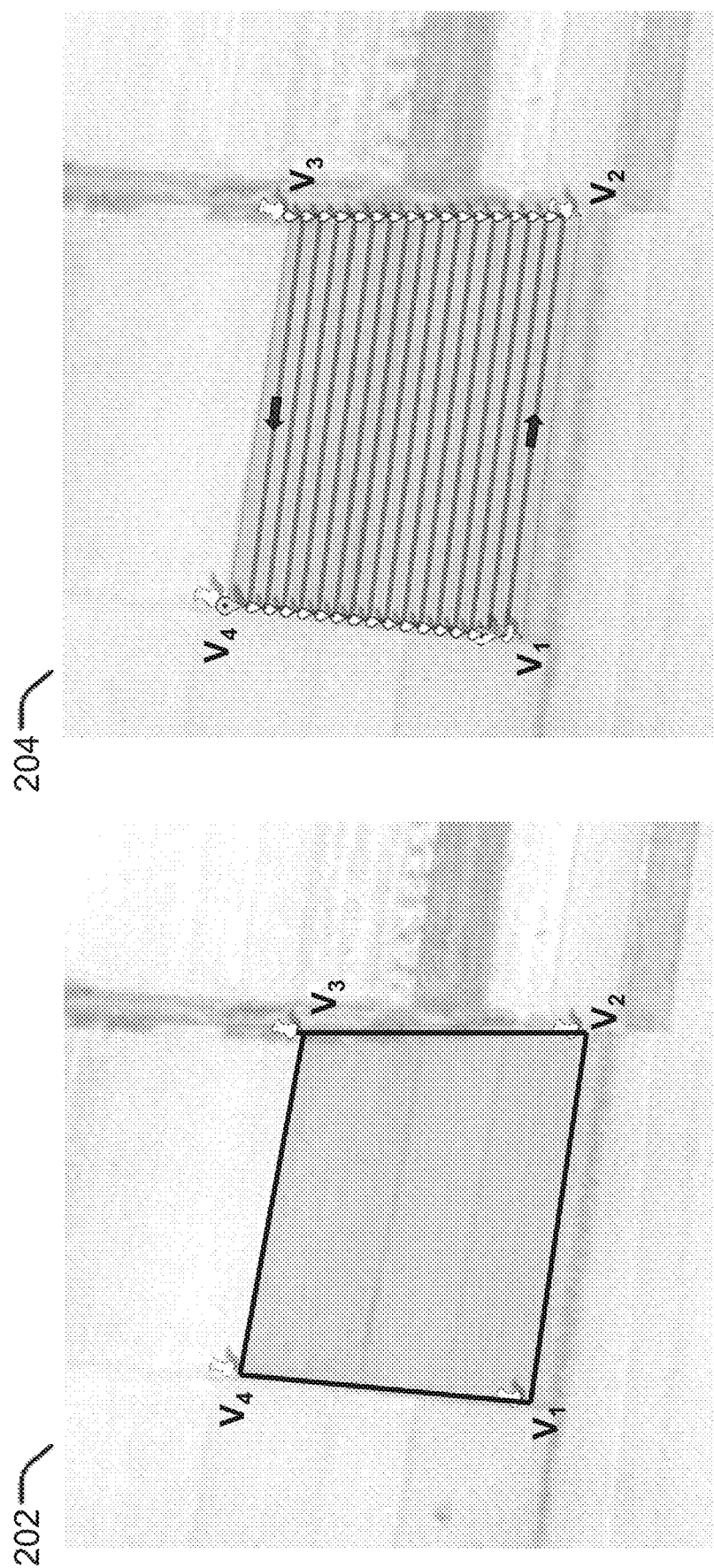
FIG. 2 are diagrams illustrating an example interface for specifying and reviewing a bounded flight area.

FIG. 2 are diagrams illustrating an example interface for specifying and reviewing a bounded flight area. The example interface shown on FIG. 2 may be provided via the GUI 108 of FIG. 1. A user may specify the bounded flight/application area (e.g., area where fertilizer/pesticide is to be applied via an aerial vehicle) by obtaining a map of the area of interest (e.g., by entering an address, location coordinate, navigating to the area of interest on a map, verifying a current location of a mobile device, etc.). Then the user is able to specify approximate locations on the map that define the vertices of a polygon outlining the initially specified expected borders of the bounded flight/application area. For example, an outline of a field where an aerial vehicle is to spray a chemical is specified by a user on an overhead satellite map image of the field via touch inputs on a touch screen (e.g., touch screen of field mobile station 102) showing the satellite map image, where the locations of the touch inputs correspond to locations of vertices of the polygon outlining the initially specified expected borders of a field.

For example, view 202 shown a satellite map image of the area of interest and a user has specified the four vertices: $V_1$, $V_2$, $V_3$, and $V_4$ on the displayed map. Using underlying map information (e.g., map information of map module 106), the geographical locations (e.g., location coordinates, latitude/longitude, etc.) of the vertices specified on the displayed map are determined and the geographical location information is provided to the planning/monitoring module 110. The planning/monitoring module 110 determines a flight plan/route to cover the area bounded by the specified expected borders in an efficient manner.

View 204 shows a subsequent view displaying the planned flight route for the bounded area indicated in view 202. The planned flight route may be represented by a sequence of waypoints $P_i$, with each waypoint represented in absolute coordinates (e.g., latitude and longitude). The sequences of these waypoints indicate the direction of travel for the planned route and thus, the planned path for the aerial vehicle. Alternatively, the waypoints $P_i$ may be represented in relative coordinates with respect to a reference point (e.g., $P_1$) and the reference point is provided in absolute geographical location coordinates.

However using touch input specified points on a map has inherent precision limitations that prevent the full accuracy of the specified points. As previously stated, the digital map 106 may easily have position errors ranging from three to six meters. Thus not only do the position errors present themselves during the specification of the vertices, the errors may get compounded as the vertices are automatically connected to form the polygon outlining the bounded area for the aerial vehicle. In addition, the area may have changed (e.g., new crop planted, irrigation path added, etc.) from what is displayed on the satellite image map. Thus, the resulting propagated planned flight route has errors that may not allow it to completely and accurately cover the bounded area. For example, the aerial vehicle may not cover the areas within three to six meters from the actual border of a field or perhaps cover three to six meters beyond the actual border. In both scenarios, the situations fail to meet the critical criteria of fertilizer/pesticide application, which states that the fertilizer/pesticide must spray a given field uniformly and completely without spraying outside the area of the field. To mitigate the errors and perhaps even eliminate it, the border of the area is identified and corrected dynamically inflight. The planned route of the aerial vehicle is dynamically adjusted in order to more accurately detect and cover the border of the bounded area.

Figure 3:
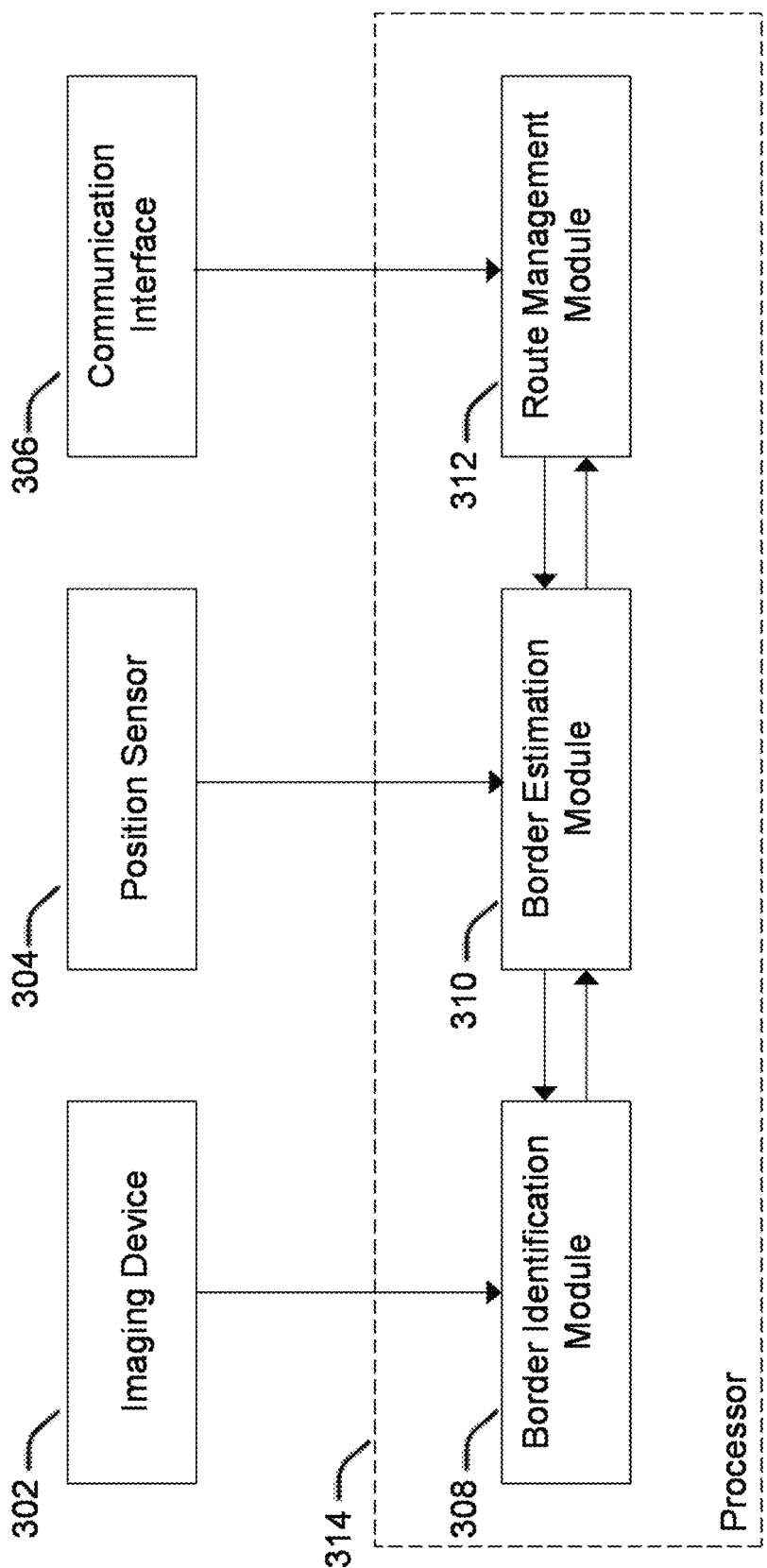
FIG. 3 is a block diagram illustrating an embodiment of a vision-based border identification and dynamic route planning system.

FIG. 3 is a block diagram illustrating an embodiment of a vision-based border identification and dynamic route planning system. Border identification and dynamic route planning system comprises an imaging device (e.g., a camera) 302, a position sensor 304, a communication interface 306, and a data processor 314. In some embodiments, imaging device 302 is able to be utilized to measure a distance value (e.g., using a stereo camera, LIDAR, etc.). The data processor 314 includes a border identification module 308, a border estimation module 310, and a route management module 312. In some embodiments, an aerial vehicle equipped with the on-board system 104 of FIG. 1 includes the components shown in FIG. 3. In some embodiments, the position & motion sensors 118 of FIG. 1 are the position sensor 304 and the communication interface 114 of FIG. 1 is the communication interface 306. In some embodiments, the data processor 314 is utilized by the navigation and guidance module 116, the flight control 120, and/or the operation control 122.

The imaging device 302 coupled to the aerial vehicle captures images in the perspective of the aerial vehicle as it traverses across an area. For example, the images may include crop or fruit trees that are to be sprayed as well as background or surroundings of the field. The data processor 314 processes these images (e.g., in the border identification module 308) to learn about the area as well as identify the border of the area.

The communication interface 306 receives the planned flight route sent by a field mobile station 102. The planned flight route may contain a sequence of waypoints $P_i$ representing the flight route as well as the polygon vertices $V_i$, where each two adjacent vertices form edges of the polygon defining the bounded area. The communication interface 306 forwards this information of planned flight route to the route management module 312, which further provides the border information to the border estimation module 310. In one embodiment, the border information consists of a sequence of the polygon vertices $V_i$ that defined the specified bounded area.

The position sensor 304, attached to the UAV, provides the aerial vehicle's current position. For example, the position sensor 304 may contain a GPS which provides the aerial vehicle's current position in geographical coordinates such as longitude, latitude, and altitude. In some embodiments, the position sensor 304 measures the yaw angle, roll angle, and/or pitch angle of the aerial vehicle. These angle information along with information on the mounting positions of the imaging device 302, and specification of the imaging device 302 (e.g., field of view) may be utilized to identify which portion of area relative to the location of the aerial vehicle is being captured by the imaging device 302. Additionally, distance between the imaging device 302 and the area being captured may be determined using stereo camera images of the imaging device 302. The border estimation module 310 receives the border information from the route management module 312 and the aerial vehicle's current position from the position sensor 304. It then generates the expected border location with respect to the aerial vehicle based on the aerial vehicle's current position and the border information. Embodiments of the border estimation module 310 will be described in detail along with FIG. 10.

The border identification module 308 processes images obtained from the imaging device 302 in conjunction with the expected border location information received from the border estimation module 310 so as to identify the actual predicted location of the border. The border identification module 308 further provides the identified border location back to the border estimation module 310, which integrates the identified predicted border location with the expected border location to derive an estimate of the actual border location. Subsequently, the border estimation module 310 relays the border location estimates to the route management module 312, and the route management module 312 incorporates the border location estimates to automatically and dynamically update or adjust the flight route inflight for increased accuracy and efficiency.

Figure 4:
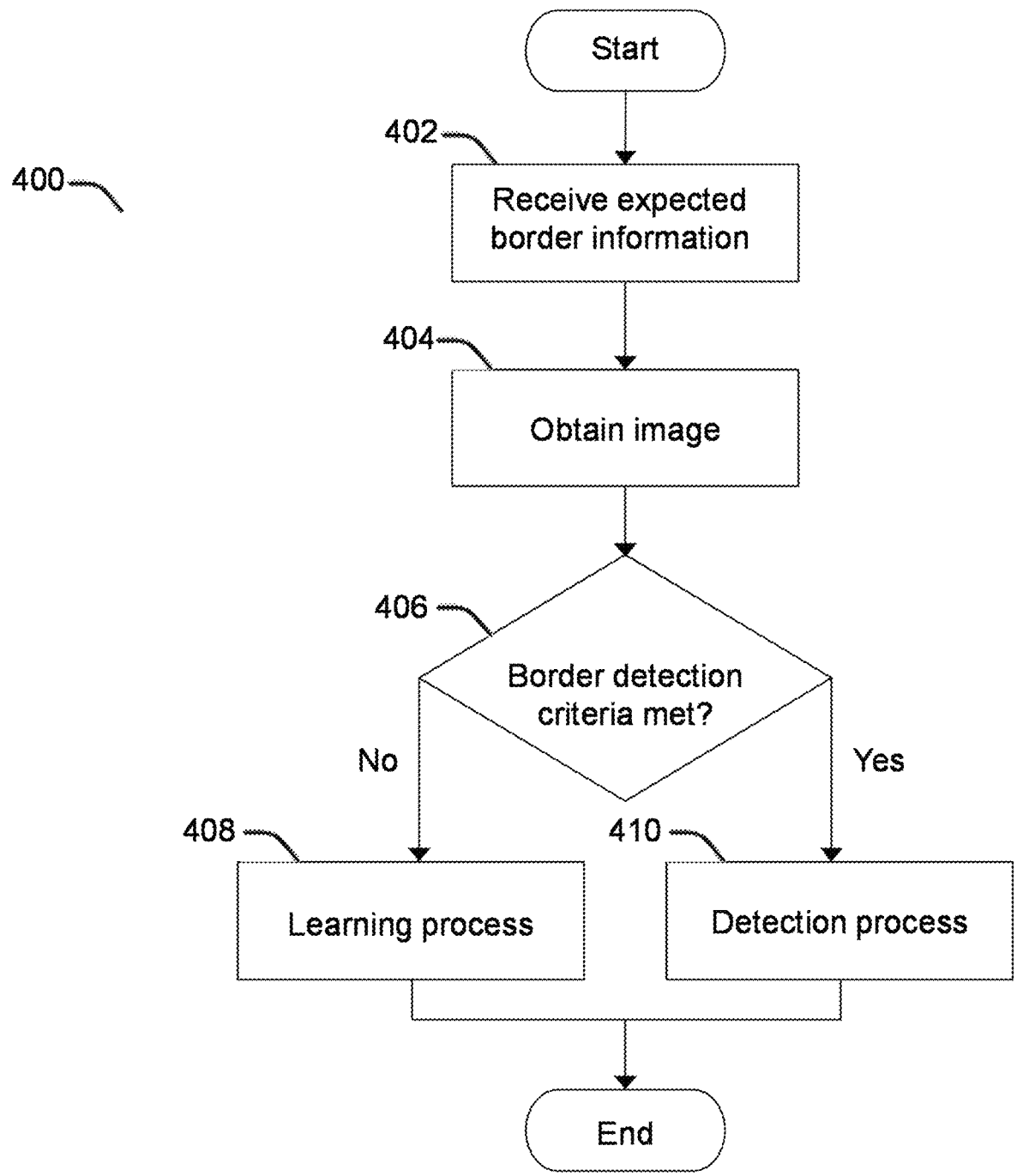
FIG. 4 is a flowchart illustrating an embodiment of a process for border identification learning and detection.

FIG. 4 is a flowchart illustrating an embodiment of a process for border identification learning and detection. The process of FIG. 4 may be at least in part implemented on on-board system 104 of FIG. 1 and/or processor 314 of FIG. 3. At 402, the expected border information is received from the border estimation module 310. For example, an outline of a field where an aerial vehicle is to spray a chemical is specified by a user on an overhead satellite map image of the field via touch inputs on a touch screen (e.g., touch screen of field mobile station 102) showing the satellite map image, where the locations of the touch inputs correspond to locations of vertices of the polygon outlining the initial expected borders of a field. In this example, the geographical coordinates corresponding to these touch input provided locations are included in the planned flight path received by the route management module 312 via the communication interface 306. The route management module 312 provides the geographical coordinates of these vertices to the border estimation module 310, which converts the geographical coordinates of the vertices to UAV-centered coordinates. For example, the expected border information is referenced with respect to the current location/position of the UAV as the UAV flies across the area. In some embodiments, the expected border location information includes location information regarding the edge of the polygon outlining the bounded flight/application area. In some embodiments, the expected border location information was at least in part updated during a previous iteration of process 400 (e.g., updated during previous flight). For example, the expected border location information is updated in the border estimation module 310 (e.g., described later with FIG. 10) with the identified border from the border detection process of 410.

At 404, an image is obtained. For example, the imaging device 302 continually captures images as the aerial vehicle is in flight and an image captured by imaging device 302 is received.

At 406, it is determined whether border detection criteria has been met. For example, the border identification module 308 determines whether a location of the aerial vehicle corresponding to when the obtained image was captured is within a threshold distance from an expected border (e.g., near at least a portion of edges of the polygon identified in information received in 402), and it is determined that border detection criteria has been met if the location of the aerial vehicle is within the threshold distance. Otherwise, it is determined that border detection criteria has not been met (e.g., detected position of the aerial vehicle is in the bounded area to capture images of ground within the bounded area but not close enough to the border of the bounded area). In another example, the border identification module 308 determines whether a geographical location of a ground area captured in the obtained image corresponds to at least a portion of an expected border (e.g., captures area corresponding to at least a portion of edges of the polygon identified in information received in 402), and it is determined that border detection criteria has been met if the geographical location of the ground area corresponds to at least a portion of the expected border. The geographical area of the ground area captured by the imaging device may be determined based on a detected geographical location of the aerial vehicle (e.g., detected using GPS) along with detected yaw angle, roll angle, and/or pitch angle, mounting positions of the imaging device, and specification of the imaging device (e.g., field of view).

If in 406 it is determined that border detection criteria has not been met, at 408, a learning process is performed. If in 406 it is determined that border detection criteria has been met, at 410, a border detection process is performed. The process 400 may by repeated periodically (e.g., for each new image captured periodically) and/or dynamically.

Figure 5A:
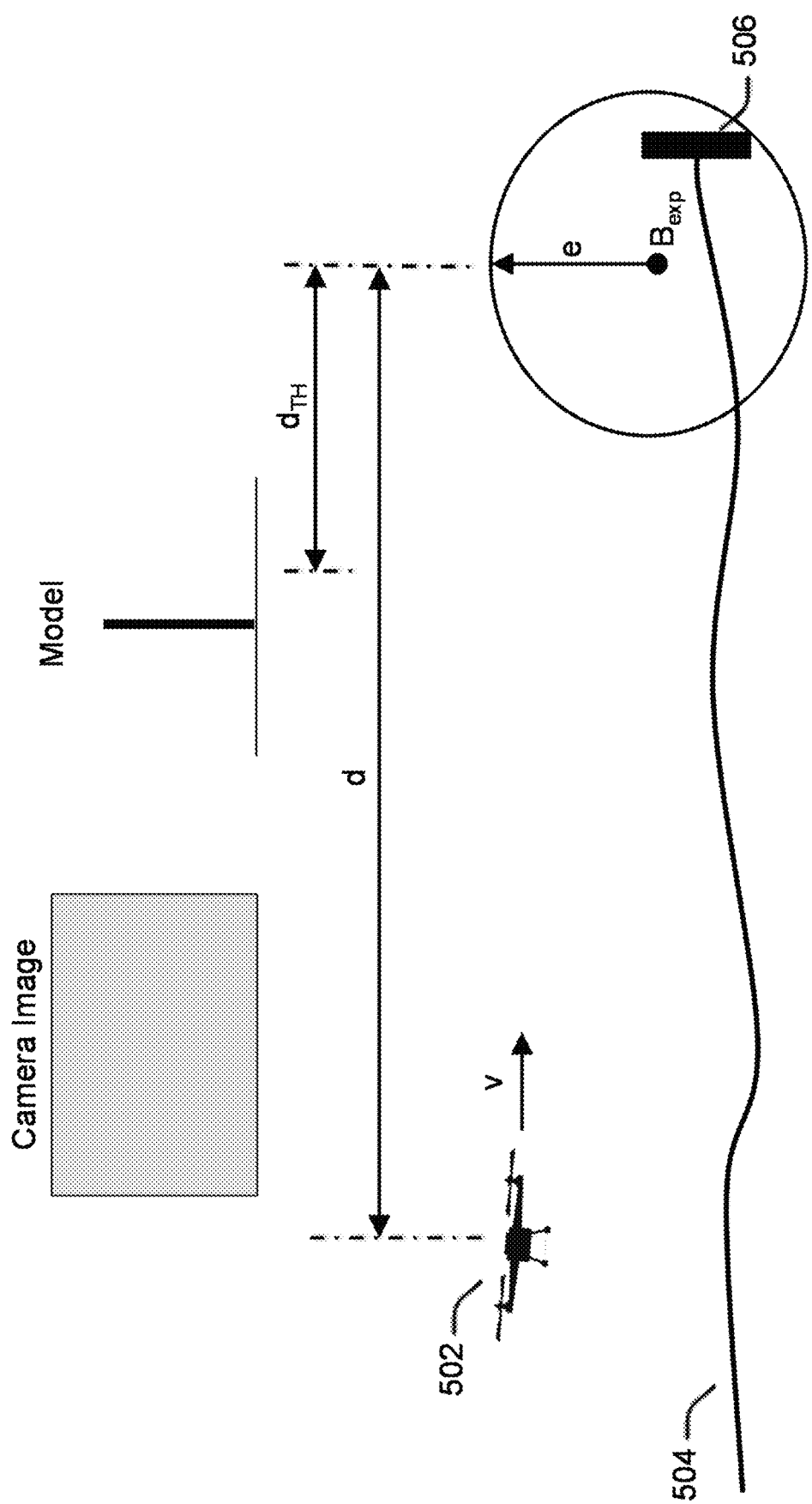
FIGS. 5A-5C are diagrams illustrating an example of triggering a learning process.
Figure 5B:
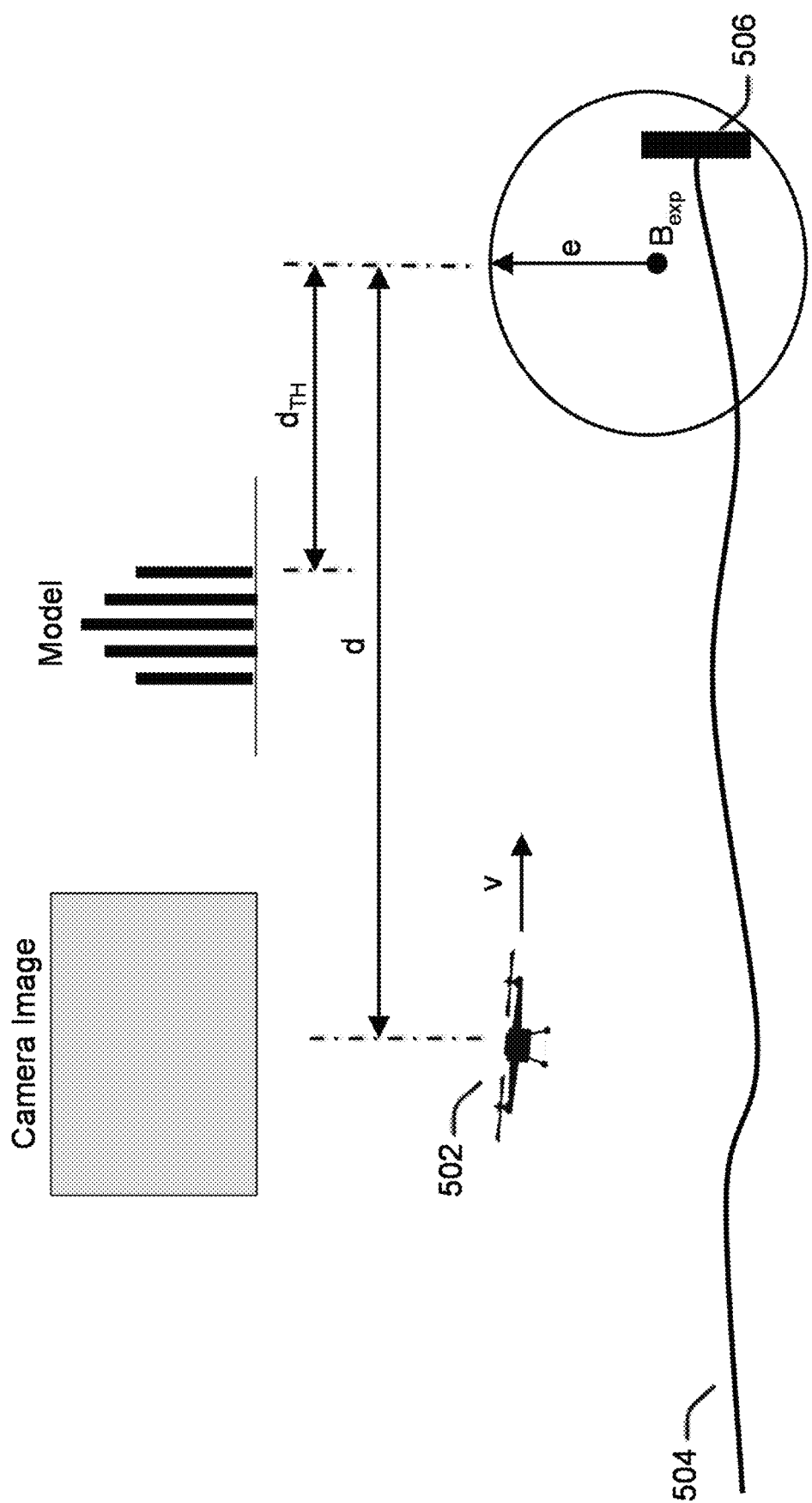
Figure 5C:
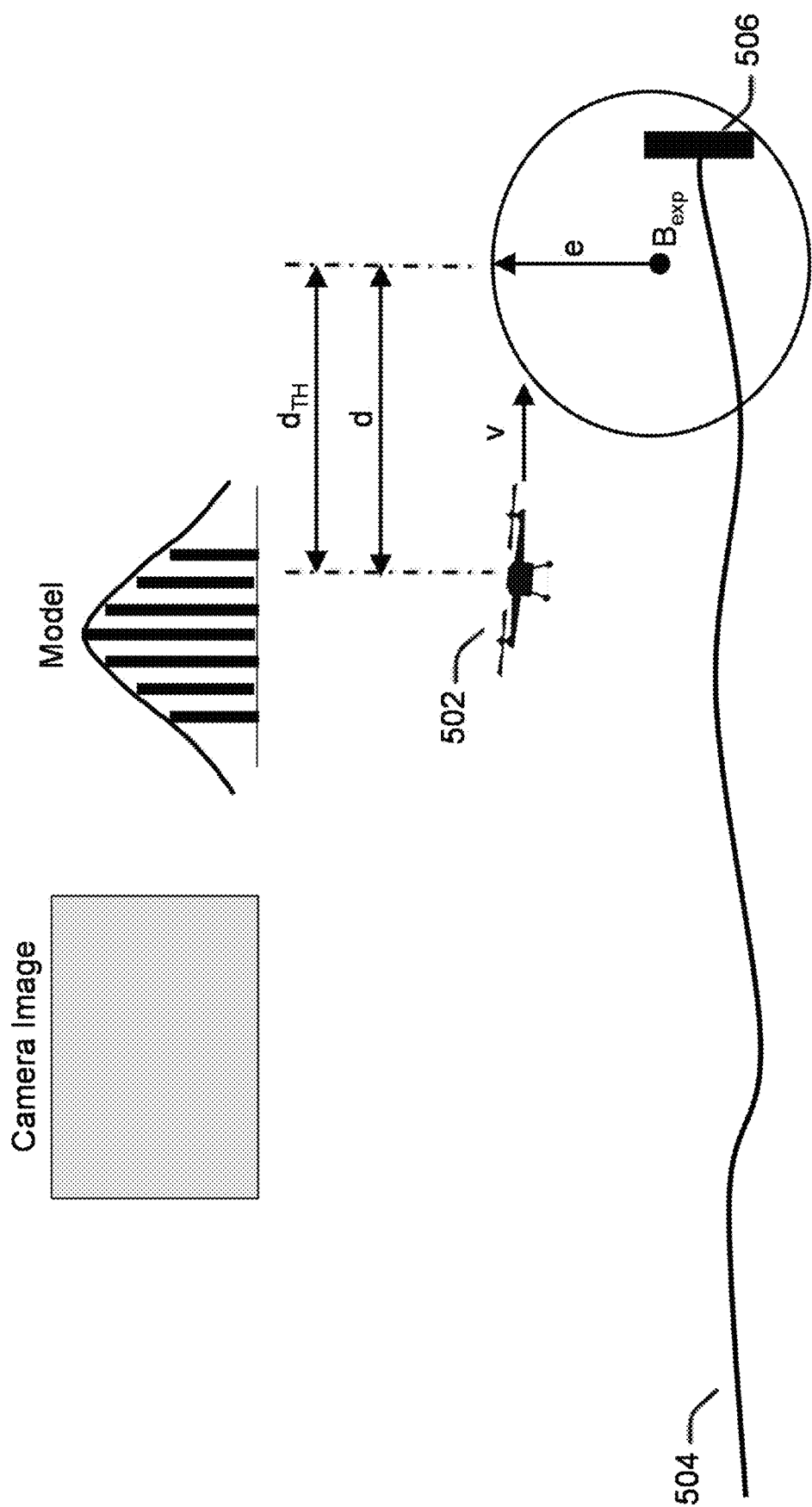

A further detailed embodiment that illustrates the learning process 408 is shown in FIG. 5A to FIG. 5C. The learning process 408 is executed while the aerial vehicle is still far away from the border of the bounded flight/application area. As a result, the images captured by the imaging device 302 during the learning process are (entirely or mostly) of areas inside the bounded flight/application area (e.g., inside the specified borders of a crop field area). By processing these images during subsequent executions of the learning process 408, a model representation of the visual characteristics of the areas inside the borders is generated. Such visual characteristics may involve but are not limited to various visual features such as the distribution of color and texture among others. These visual features can take the forms of manually defined features such as standard color space (e.g., RGB, YUV, HSV, etc.) and texture (e.g., histogram of gradients, bag of words of X), or features learned from a large set of data (in either an unsupervised or supervised manner) such as deep learning and support vector machines. In some embodiments, an initial machine learning model is pre-trained using a base training data set (e.g., a base model trained offline using training images and the base model is provided to the aerial vehicle for further training using live stream of captured images during flight) and the learning process 408 is utilized to dynamically update this initial model inflight using images captured during flight. In some embodiments, the learning process 408 updates a model that has been trained during a previous flight or session.

FIGS. 5A-5C are diagrams illustrating an example of triggering a learning process (e.g., process 408). FIG. 5A shows unmanned aerial vehicle (UAV) 502 that begins to travel above the field 504. The UAV 502 is traveling at a velocity of v towards the expected border $B_{exp}$ minimizing the distance d between the UAV 502 and the expected border $B_{exp}$. As the UAV 502 is traveling above the field 504, the camera 302 continues capturing images of the field at a pre-defined rate (e.g., 5 hz, 10 hz, or higher) or at variable rates dependent on factors such as the UAV's speed. For every new image or specific areas of the images obtained, each pixel in the images is analyzed for its feature values. For example, given that standard color space RGB is utilized as the characterizing feature for the field, the RGB color space values, [R, G, B], are obtained for each pixel in the image. In addition, if HSV color space is used, the HSV color space values are obtained for each pixel of the images.

Using the data obtained for the feature values of the pixels, statistical models are built for the distribution of said features. The model may be a Gaussian model with two parameters: mean and variance. For example, in the case with RGB color space values, a single Gaussian model will have a mean of $[r_{mean}, g_{mean}, b_{mean}]$ and a 3-by-3 variance matrix. Alternatively, the statistical model may be a histogram for the color space values. For example, in the case with HSV color space values, a histogram of hue channels may be derived based on the hue value of each pixel of the images. One representation of the histogram may be an N-by-2 matrix, where N represents the number of bins in the histogram and the two values for each bin are a hue value and a percentage of occurrence for the respective hue value.

FIG. 5A shows the initial model with limited feature values in the beginning stages of the learning process. As the UAV 502 travels towards the expected border $B_{exp}$ with the true border 506 shown in FIG. 5B, the learning process 408 continually processes new captured images, extracting the feature distributions of the new images, and incorporating the feature distributions into the statistical model. Thus, the existing model is continuously updated with each additional feature value of the pixels. In some embodiments, updating the model is to average the statistical model over time (e.g., time-averaging Gaussian model), which weighs each additional image equally. In some embodiments, updating the model may include weighing recent images more heavily than past images. As the UAV 502 reaches within the given distance of a predefined threshold, $d_{TH}$, of the expected border location, the learning process 408 is no longer triggered with a learned model denoting the characteristics of the areas inside the field as shown in FIG. 5C. Subsequently, during execution of process 400, in 406 it is determined that border detect criteria is met and detection process 410 is executed.

As described earlier with FIG. 3, the border identification module 308 receives the expected border location from the border estimation module 310. In some embodiments, the border estimation module 310 determines the expected border location with respect to the aerial vehicle by converting the border information (e.g., as defined by the vertices of the polygon field in absolute geographical or relative position coordinates) to the aerial vehicle's location coordinates where the aerial vehicle is at the origin. Hence, the expected border location $B_{exp}$ may be represented as a set of 3D coordinate values in the form of (x, y, z), where each set of 3D coordinate values (x, y, z) represents the location of a vertices with respect to the location of the aerial vehicle. Note that in the example given in FIG. 2, the bounded area for the aerial vehicle is represented by a four-sided polygon and the border the aerial vehicle is traveling towards is a line segment defined by either $V_2V_3$ or $V_1V_4$. In other situations, the bounded area polygon may have short sides and the border the aerial vehicle is traveling towards may consist of several consecutive sides. For example, when a border includes two consecutive sides, the expected border location may be represented by three sets of 3D coordinate values denoting the three vertices that define the two consecutive polygon sides.

In some embodiments, the expected border location information may also include information identifying a measure of uncertainty of the expected border. One representation of the border uncertainty may be a measure of standard deviation for each vertices of the polygon defining the border. For each vertex, an uncertainty error range may be expressed as $(x_{std}, y_{std}, z_{std})$, which defines the vertex's standard deviation in 3D coordinate space. This uncertainty error range, along with the expected border location $B_{exp}$, may be provided to the border identification module 308 by the border estimation module 310. Alternatively, the border identification module 308 may generate (and update) the uncertainty measures dynamically during the detection process 410.

Figure 6:
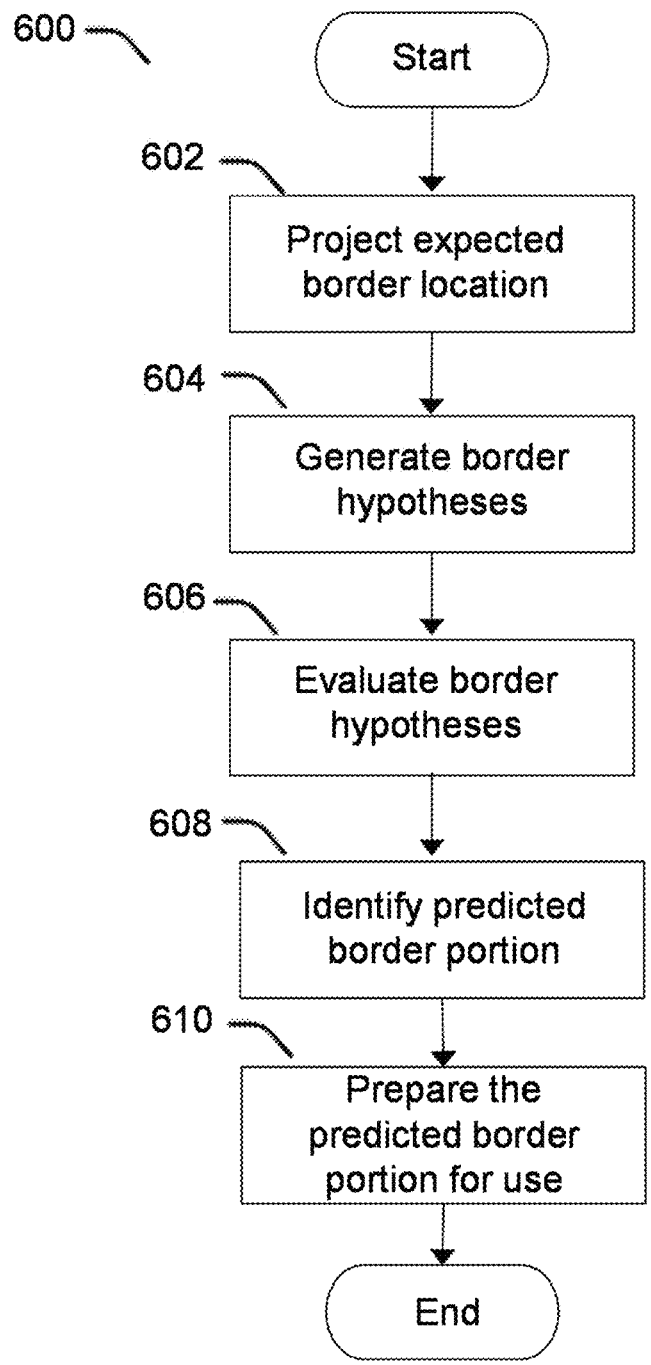
FIG. 6 is a flowchart illustrating an embodiment of a process for predicting a border.

FIG. 6 is a flowchart illustrating an embodiment of a process for predicting a border. The process of FIG. 6 may be at least in part implemented on on-board system 104 of FIG. 1 and/or processor 314 of FIG. 3. In some embodiments, at least a portion of the process of FIG. 6 is included in the detection process 410 of FIG. 4.

Figure 7:
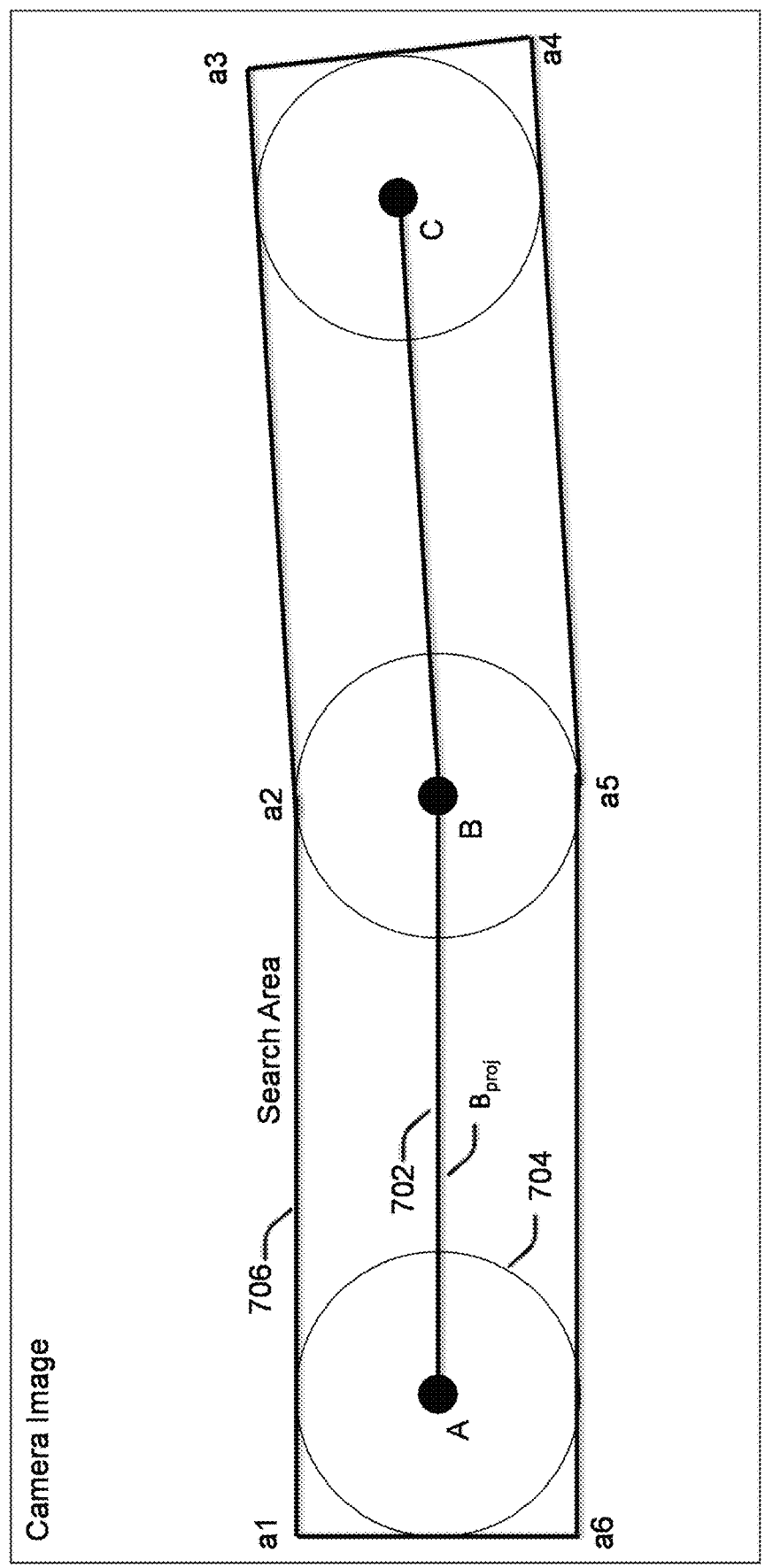
FIG. 7 is a diagram illustrating an example captured image with an identified projected border location.

Border detection process 600 begins at step 602, where the expected border location $B_{exp}$ is projected onto an image captured by an imaging device (e.g., captured by a camera included in imaging device 302). For example, location coordinates corresponding to the expected border location (e.g., three dimensional coordinates) is converted to location coordinates (e.g., two dimensional coordinates) identifying corresponding locations on the image. The projection is made by using the geometric projection relationships between the expected border location $B_{exp}$ and the imaging device's position and orientations with respect to the aerial vehicle. In some embodiments, the imaging device has no relative movement with respect to the aerial vehicle; therefore, these positions and orientations are pre-defined fixed values. In other embodiments, the imaging device may have relative movement with respect to the aerial vehicle (e.g., using a gimbal) and the border estimation module 310 provides to the border identification module 308 the information of this relative movement (e.g., measured by the position and motion sensors 118). Because the expected border location may be represented as line segments connecting vertices of the polygon outlining the bounded area for the aerial vehicle and some vertices may be outside of the image, performing the projection may include redefining the at least portion of the expected border by shortening the line segments of the expected border that are partially out of the image (e.g., place a projected border point on a portion of the line segment within the image) and by removing the line segments that are completely out of the image (e.g., the corresponding line segments cannot be identified from the image). This generates the projection of the expected border as line segments defined by projected border points. For line segments that are completely within the image, the projected border points are the projection of the polygon vertices. For line segments that are partially out of the image, the projected border points are placed on the end of the shorted line segments within the image (e.g., placed on the line segment closest to an edge of the image but a set distance away from the edge of the image). FIG. 7 is a diagram illustrating an example captured image with an identified projected border location. The captured image shown in FIG. 7 shows the projected border location 702 (i.e., $B_{proj}$), which connects the projected border points A, B, and C and the two line segments defined by them.

In some embodiments, projecting the expected border location onto the image includes selecting a search area within the image, where the search area is centered at the projected border $B_{proj}$ line with the size of the search area reflecting the uncertainty error ranges of the projected border points. First, the uncertainty errors of each projected border point can be projected onto the image as an area around the projected border point. FIG. 7 illustrates the circled area 704 as the projected uncertainty errors of the projected border point A. Although it is shown as a circled area, the projected uncertainty area can take other shapes such as an ellipsoid or other circular area as well. Subsequently, the search area can be generated as the area that encompasses the projected uncertainty errors of each border projection point with the projected border $B_{proj}$ as its center. For the example shown in FIG. 7, the search area 706 can be defined by a polygon with vertices a1, a2, a3, a4, a5, and a6.

Figure 8:
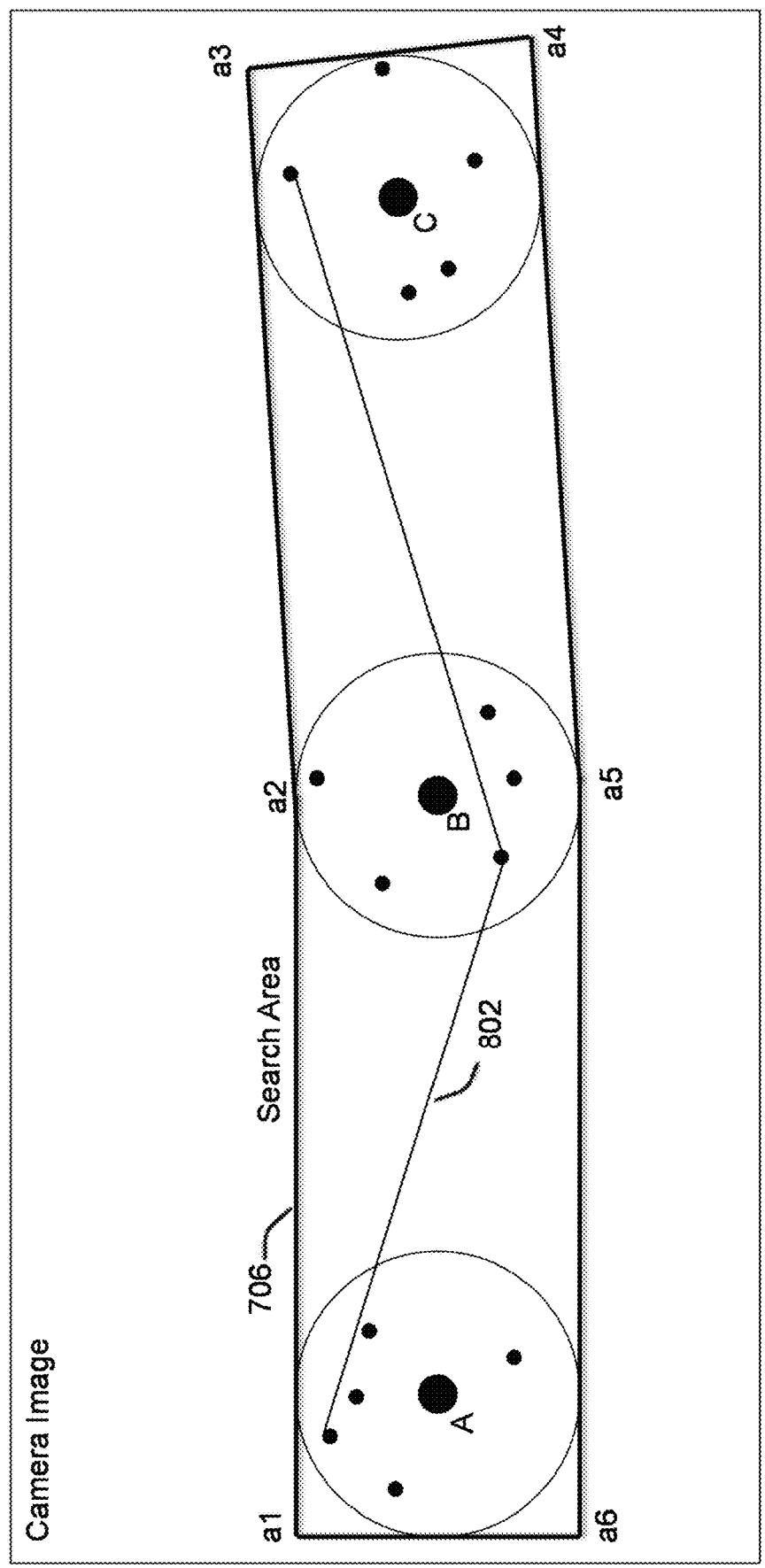
FIG. 8 is a diagram illustrating an example of candidate points for the example shown in FIG. 7.

At step 604, border hypotheses are generated based on the projection of step 602. For each projected border point, a fixed number of candidate points is generated. FIG. 8 is a diagram illustrating an example of candidate points for the example shown in FIG. 7. The larger points A, B, and C shown in FIG. 8 represent the projected border points while the smaller points represent the candidate points. In some embodiments, the candidate points are randomly generated based on projected border points and their respective uncertainties. Alternatively, the candidate points can also be generated deterministically. A border hypothesis can then be generated by selecting one candidate point from each projected search area and connecting the selected candidate points to form a curved or straight line as shown in line 802 of FIG. 8. If n candidate points are generated from each uncertainty area, the possible points from each uncertainty area will be (n+1) including the projected border point itself. Consequently, for a border consisting of m projected points (thus (m−1) line segments), the number of border hypotheses will be $(n+1)^m$. Each border hypothesis serves as a candidate border location for further evaluation in subsequent steps.

At 606, each border hypothesis is evaluated by comparing its respective features against a learned model (e.g., model learned using the learning process 408 of FIG. 4). The statistical feature of a border hypothesis may be derived based on the features of the pixels on or along the corresponding border hypothesis (e.g., consisting of line segments) in the image. For example, when the learned statistical model is of the distribution of the RGB color space of the pixels, RGB values of pixels along a border hypothesis within the search area may be extracted to derive the corresponding Gaussian model of the border hypothesis. This Gaussian model may then be compared with the learned Gaussian model. In some embodiments, the comparison yields a discrepancy measure denoting the degree of deviation from the learned model. The larger the discrepancy measure between the model of a border hypothesis and the learned model, the greater the likelihood that the border hypothesis corresponds to the actual border. Similarly, when HSV color space is chosen for the statistical model during model learning/training (e.g., during the learning process 408), HSV values of pixels along a border hypothesis within the search area may be extracted to derive the corresponding histogram model. The histogram model for the border hypothesis may then be compared to the learned model, and the distance between the two histograms can be used as the discrepancy measure. Thus, one discrepancy measurement can be computed for each border hypothesis in step 606.

In another embodiment, the evaluation of a border hypothesis may identify and analyze portions (e.g., pixels) on both sides of the border hypothesis in the search area. The side of the border hypothesis that is identified as belonging to the bounded area may be referred to as the internal side and the other side that is identified as belonging to the outside of the bounded area may be referred to as the external side. Two statistical models (e.g., statistical values identifying the features for each side) may be built, one for the portion of the image (e.g., pixels) on the internal side and the other for the portion of the image (e.g., pixels) on the external side of the border hypothesis. Thus, two discrepancy measures can be computed by comparing both models against the learned model. If one discrepancy measure is small (e.g., smaller than a threshold), then this signifies the corresponding side fits the learned model well, illustrating that the corresponding portion of image is most likely that of the bounded area. If the discrepancy measure is large (e.g., larger than a threshold), then this signifies the corresponding side deviates greatly from the learned model, illustrating the corresponding portion of image most likely does not belong to the bounded area. In ideal situations when the border hypothesis indeed represents the actual border, the portion of image on the internal side should conform well to the learned model while the portion of the image on the external side likely exhibits statistical characteristics different from the learned model. Accordingly, the discrepancy measure for the internal side of this border hypothesis shall be small and the discrepancy measurement for the external side shall be large. Thus, the evaluation of the border hypothesis yields two discrepancy measures for each border hypothesis.

In some embodiments, the evaluation of a border hypothesis in step 606 may use both the portion of the image along the border hypothesis as well as the portions of the image at the two sides of the border hypothesis. As a result, the evaluation yields three discrepancy measures for each border hypothesis. The three measures may be referred to as the center discrepancy, the internal discrepancy, and the external discrepancy, respectively.

Figure 9:
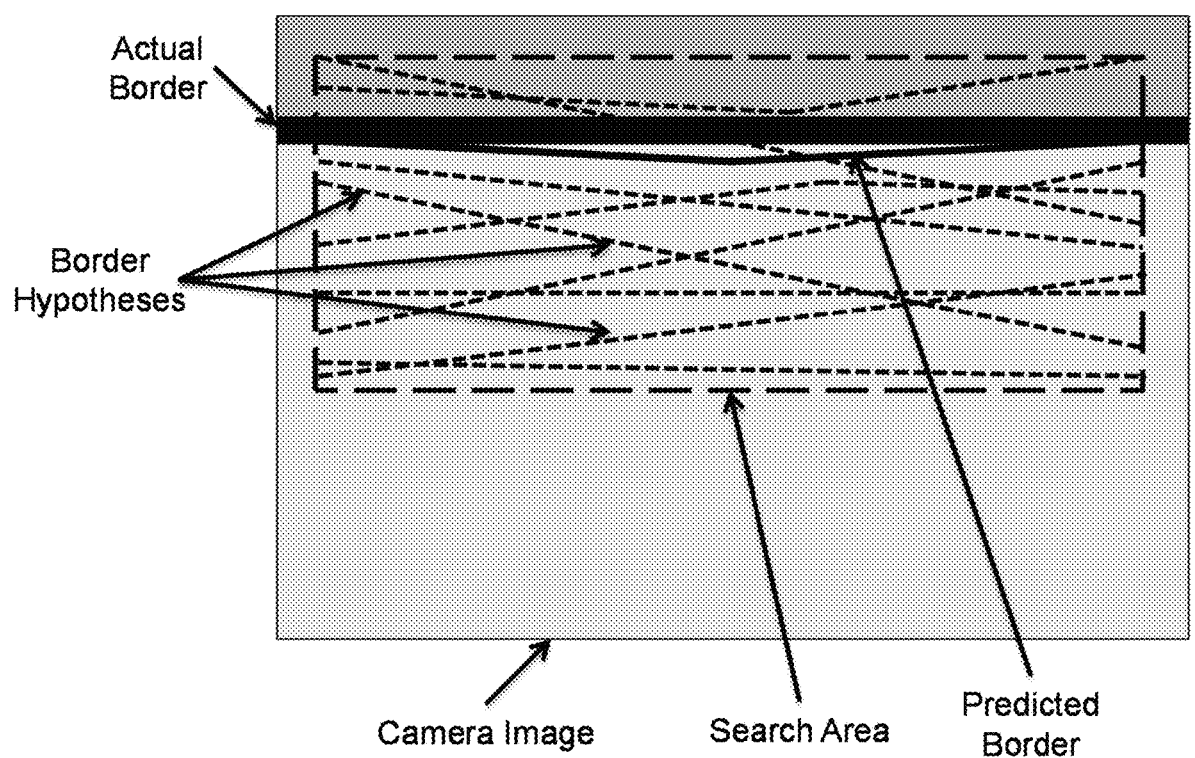
FIG. 9 is a diagram illustrating an example captured image that has been analyzed to identify the search area, the border hypotheses, and the identified predicted border portion in the image.

At 608, a predicted border portion is determined. For example, the border hypothesis that is most likely to be the actual border is identified as the predicted border. In some embodiments when the portion of the image along the border hypothesis is used in the evaluation of step 606, the discrepancy measures for the border hypothesis are compared and the border hypothesis that yields the largest discrepancy measure is identified to be the predicted border. FIG. 9 is a diagram illustrating an example captured image that has been analyzed to identify the search area, the border hypotheses, and the identified predicted border portion in the image. As shown in the example of FIG. 9, the identified predicted border portion is the border hypothesis that is closest to the actual border. Moreover, a measure of confidence level may also be provided based on the largest discrepancy measure. For example, the larger the discrepancy measurement, the higher the measure of confidence level. A confidence level that is smaller than a predefined threshold may indicate a failure in border detection based on the grabbed image, and in the event the confidence level is smaller than the predefined threshold, the predicted border portion may be unable to be determined. The detection process will then continue and the next process cycle may result in a successfully predicted border portion identification.

For the embodiments that use portions of the image on both sides of a border hypothesis for the evaluation in step 606, each border hypothesis may have two associated discrepancy measures: the internal discrepancy and the external discrepancy. In some embodiments, the internal discrepancy is then sorted in ascending order with the smallest internal discrepancy ranked first, and the external discrepancy is sorted in descending order with the largest external discrepancy ranked first. When a border hypothesis has an internal discrepancy and external discrepancy that both rank first, it is identified as the border. In other words, the portion of the image on the internal side of this border hypothesis conforms to the learned model the best and the portion of the image on the external side deviates from the learned model the most. This indicates that the internal side of this border hypothesis is most likely within the bounded area and the external side is most likely outside the bounded area. In cases where the border hypothesis associated with the first-ranking internal discrepancy measure is not the border hypothesis associated with the first-ranking external discrepancy measure, a sum of the two rankings can be computed for each border hypothesis and the border hypothesis that is associated with the smallest sum is identified as the predicted border.

In an alternative embodiment, the difference between the two discrepancy measures is used to identify the predicted border. For each border hypothesis, the difference between the two discrepancy measures is calculated; the differences are then sorted, and the border hypothesis associated with the largest difference is identified as the predicted border.

In a further embodiment where a portion of the image along the border hypothesis and portions of the image on both sides of the border hypothesis (exclusive of the portion of the image along the border hypothesis) are used in the evaluation of border hypotheses, each border hypothesis is associated with three discrepancy measures. Each discrepancy measure may be sorted with the center discrepancy (along the border hypothesis) sorted in descending order, the internal discrepancy in ascending order, and the external discrepancy in descending order. The sum of the three rankings for each border hypothesis may be sorted as well in ascending order. The border hypothesis that has the smallest sum of the three rankings may be identified as the predicted border. Moreover, a measure of confidence level may be computed based on the discrepancy measures of this border hypothesis.

At 610, the identified predicted border portion is prepared for use. For example, the identified predicted border is prepared for use during flight of the aerial vehicle to update a flight path of the aerial vehicle. In some embodiments, preparing the identified predicted border includes converting location coordinates of the identified predicted border (e.g., candidate points defining the identified predicted border portion) from the 2D coordinates in the image to the 3D coordinates (e.g., location coordinate) with respect to the aerial vehicle. This step may include performing the inverse operation of step 602, by projecting image coordinates back to location coordinates for use during aerial vehicle operation. The prepared identified predicted border portion may then be outputted by the border identification module 308 to the border estimation module 310. In some embodiments, the associated measure of confidence level of the identified predicted border is also provided.

As discussed along with FIG. 3, upon receiving the identified predicted border from the border identification module 308, the border estimation module 310 may integrate the identified predicted border with the expected border location to derive a revised estimate of the actual border location (e.g., updated expected border location). The border estimation module 310 further relays the updated border location estimates to the route management module 312 for dynamic route adjustment so that the aerial vehicle will reach but not exceed the updated expected border location for improved accuracy and coverage of the fertilizer/pesticide application.

Figure 10:
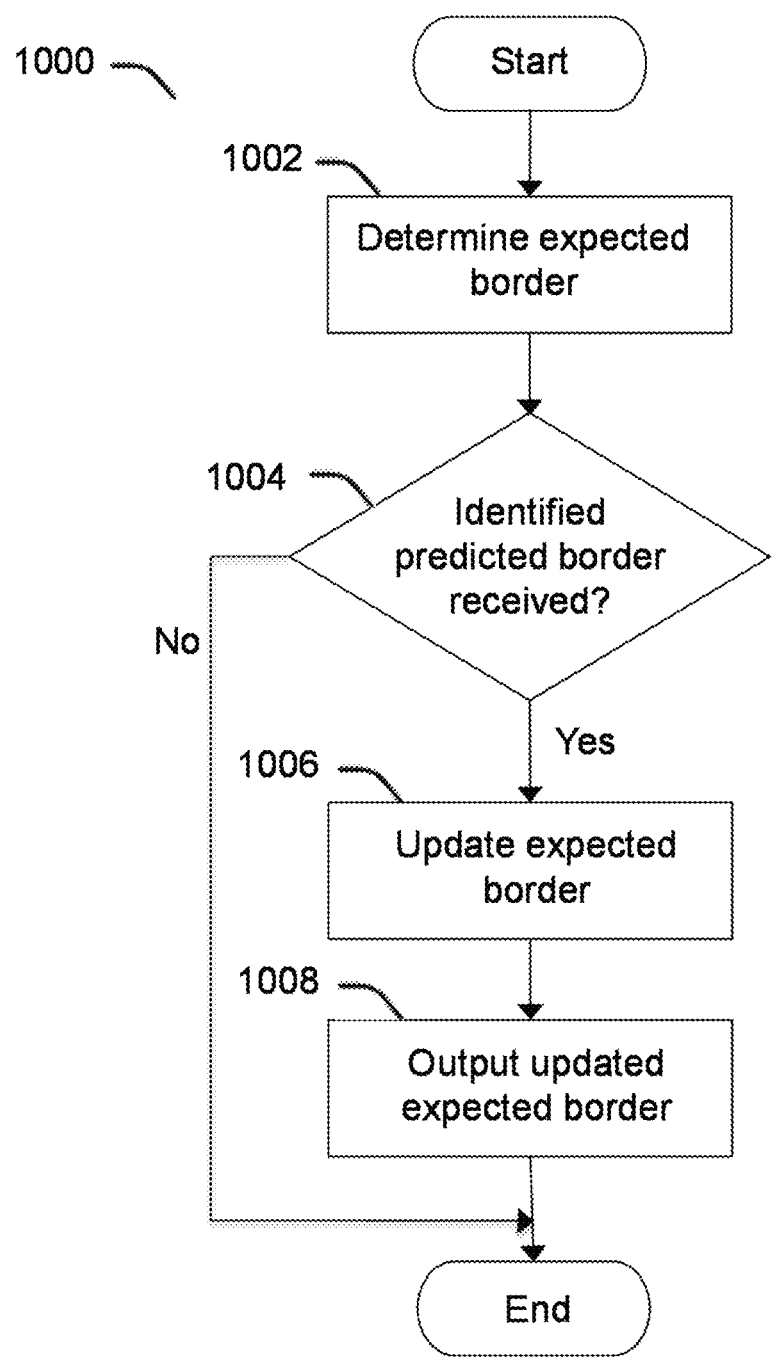
FIG. 10 is a flowchart illustrating an embodiment of a border estimation process.

FIG. 10 is a flowchart illustrating an embodiment of a border estimation process. The process of FIG. 10 may be at least in part implemented on on-board system 104 of FIG. 1 and/or processor 314 of FIG. 3. At the beginning of each flight path segment (e.g., the segment from a waypoint Pi to its next waypoint Pi+1), the estimated border is initialized based on the border information provided by the route management module 312. The border information may be defined by the vertices of the polygon covering the bounded area in either absolute (e.g., earth-fixed coordinates such as longitude, latitude, and altitude) or relative position coordinates (e.g., local position coordinates such as north, east, and down with respect to a reference point). In some embodiments, if the border information is provided in absolute coordinates, it is converted to north-east-down local coordinates and the border estimation is performed using these local coordinates. The route management module may have converted the polygon defining the bounded area from absolute position coordinates to the local coordinates, and the module provides the border information in the local coordinates.

At 1002, an expected border is determined. For example, the location of the expected border is converted with respect to an aerial vehicle's current position, if applicable. For example, the position sensor 304 includes a GPS that measures the aerial vehicle's current position in geographical coordinates of latitude, longitude, and altitude. The expected border is associated with one or several consecutive straight line segments, each defined by two end points as $V_i$ and $V_{i+1}$ represented in the local position coordinates. Converting the expected border may include converting the aerial vehicle's current position from the geographical coordinates to the corresponding local position coordinates, and converting the expected border to vehicle-fixed coordinates (e.g., aerial vehicle body-fixed coordinates XYZ, with X representing the aerial vehicle's longitudinal direction, Y representing the aerial vehicle's lateral direction, and Z representing a direction perpendicular to the aerial vehicle's XY plane) by incorporating the aerial vehicle's attitudes (e.g., yaw, pitch, and roll angles). In embodiments where the expected border is defined in absolute geographical coordinates, the expected border with respect to the aerial vehicle's current position can be computed by first converting the border end points V, from the geographical coordinates to a local coordinate (e.g., north-east-down) with the aerial vehicle position as the reference (i.e., origin of the coordinates) and then converting them to vehicle-fixed coordinates. In some embodiments, the converted expected border is then sent to the border identification module 308, which will execute either the learning process or the detection process accordingly as described with FIG. 4.

At 1004, it is determined whether an identified predicted border has been received. In some embodiments, the identified predicted border is determined using the process of FIG. 6. For example, the border estimation module 310 checks whether there is an identified border from the border identification module 308; if not, the border estimation module 310 will exit without updating the estimated border; otherwise, it will continue to step 1006 to integrate the identified predicted border. In some embodiments, since the identified predicted border is specified with respect to the aerial vehicle (e.g., in vehicle-fixed coordinates), the border estimation module first converts the identified predicted border from the vehicle-fixed coordinates to the local position coordinates. After the conversion, both the identified border and the estimated border are in the same local position coordinates and they represent the same actual border location which is fixed (non-varying) in the local position coordinates. If there is no error in the polygon outlining the bounded area, the position sensor 304, or the border identification, the identified border, and the estimated border should be the same.

At 1006, the expected border is updated. The expected border is updated using the identified predicted border. For example, the expected border is averaged with the identified predicted border. In other words, the position of each end point of the border segment is the average of the corresponding end point in the expected border and that of the identified predicted border. In some embodiments, forgetting factors are utilized to allow fast or slow convergence. For example, the expected border can be represented by a set of 3D coordinate values in the form of (x, y, z), where each 3D coordinate value (x, y, z) represents the location of an end point (or vertex) defining the line segments of the border. The forgetting-factor-based integration generates the new (x, y, z) for each end point by computing:

$$x(k+1)=\lambda*x(k)+(1-\lambda)*x\_identified(k);$$

$$y(k+1)=\lambda*y(k)+(1-\lambda)*y\_identified(k);$$

$$z(k+1)=\lambda*z(k)+(1-\lambda)*z\_identified(k);$$

where (x(k+1), y(k+1), z(k+1)) is the new location of an end point in the expected border, (x(k), y(k), z(k)) is the location of the end point before the integration, and (x_identified(k), y_identified(k), z_identified(k)) is the location of the corresponding end point in the identified predicted border. The forgetting factor λ is between 0 and 1, and the smaller λ is the faster the expected border is approaching the identified predicted border. Multiple forgetting factors could be involved as well, with smaller forgetting factors at the earlier stage of the border estimation so that the expected border catches up with the identified predicted border quickly at the beginning and larger forgetting factors at the later stage of the border estimation so as to reduce sensitivity to the recent identification.

In some embodiments, a Kalman filter is applied to leverage the uncertainty of the expected border and the confidence of the identified predicted border. The (x, y, z) coordinates of each end point of the border construct the Kalman filter states X and the expected border is the estimate of this state. The identified predicted border represents the measurement of the Kalman filter output Y. Accordingly, the Kalman filter model for the border estimation can be represented as $$X(k+1)=X(k)+w(k+1)$$

$$Y(k+1)=X(k+1)+v(k+1)$$

where w(k+1)~N(0, Q) is the process noise and v(k+1)~N(0, R(k)) is the observation noise. The covariance matrix Q is initialized to be the uncertainty of the border information (which is the initial value of the estimated border), and the covariance matrix R(k) reflects the confidence of the identified predicted border. The higher the confidence, the smaller the covariance matrix R(k). With the system model for the Kalman filter and the covariance matrix Q and R(k) stated above, standard Kalman filter equations can be applied to compute the Kalman filter gain and update the state estimate (i.e., the updated expected border) as well as its associated error covariance matrix P(k).

At 1008, the updated expected border is outputted. For example, after updating the expected border in step 1006, the border estimation process 1000 further outputs the updated expected border to the route management module 312 in step 1008. In some embodiments, the covariance matrix of the expected border is also updated in step 1006 and sent to the route management module 312 in step 1008 as well. In some embodiments, the border estimation process 1000 checks whether the covariance of the expected border is small enough (e.g., smaller than a pre-defined threshold) and only outputs the expected border if the covariance is small. The border estimation process 1000 exits after step 1008 and the updated expected border and its covariance will be used in the next cycle to determine the expected border in step 1002. This will also provide a more accurate location of the expected border to the border identification module 308 as well.

Upon receiving the updated expected border from the border estimation module 310, the route management module 312 may update the flight path so that the flight path will cover/reach the expected border but not exceed the expected border.

Figure 11A:
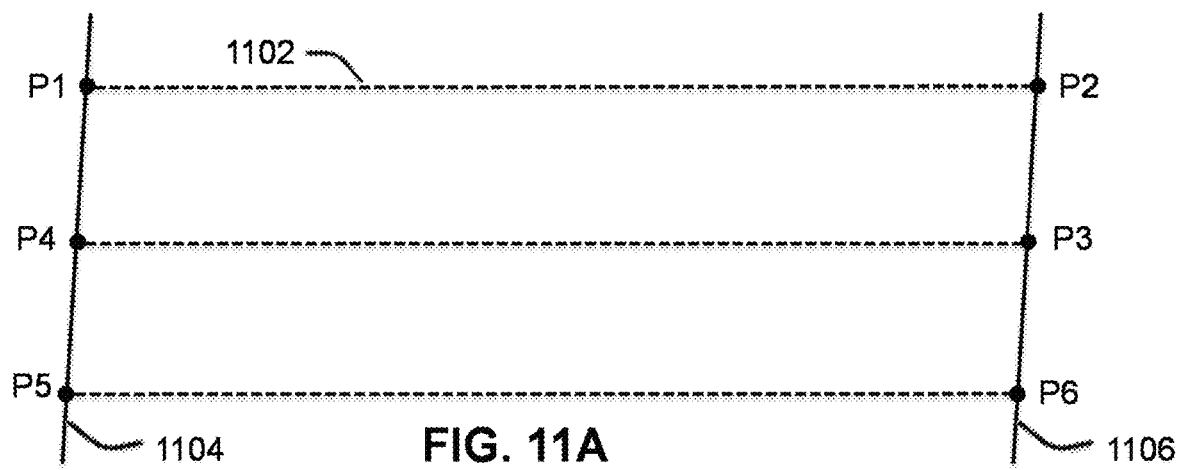
FIGS. 11A-11B are diagrams illustrating an example flight path near a border of a bounded area of an aerial vehicle.
Figure 11B:
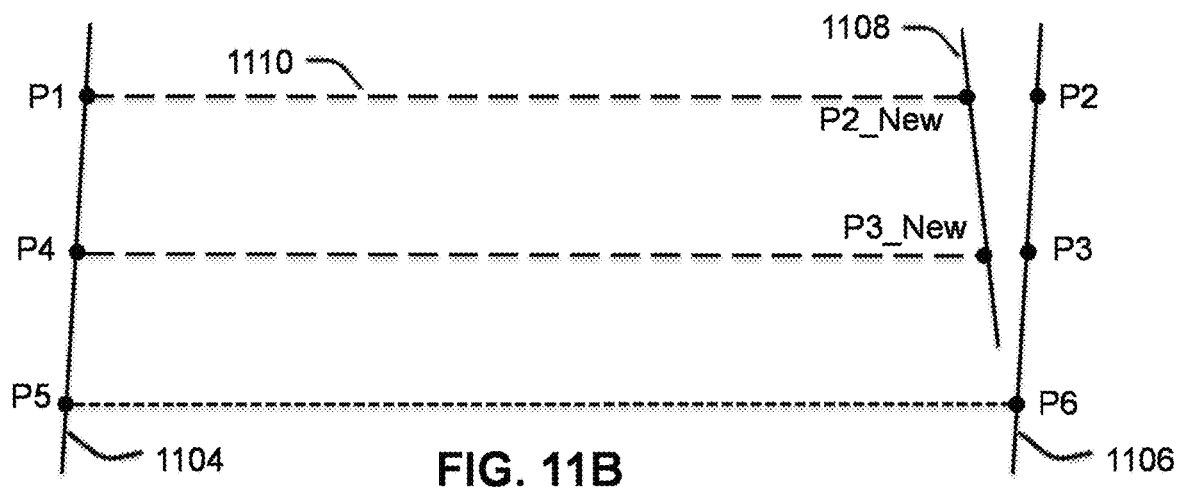

FIGS. 11A-11B are diagrams illustrating an example flight path near a border of a bounded area of an aerial vehicle. FIG. 11A illustrates original flight path 1102 and original initially specified borders 1104 and 1106. The original flight path 1102 consists of way points P1, P2, P3, P4, P5, and P6 on borders. As the aerial vehicle travels from P1 to P2 along the flight segment defined by P1 and P2, the border identification module 308 may perform the learning process to first build the statistical model of the visual characteristics of the internal of the field. When the aerial vehicle is approaching the initially specified expected border 1106, the border identification module 308 performs the detection process to identify a prediction of the actual border. The border estimation module 310 may incorporate the identified predicted border to update the expected border to better estimate the location of the actual border. FIG. 11B illustrates the updated expected border 1108. Based on the updated expected border, the route management module 312 adjusts the waypoints that are affected by the discrepancy between the previous expected border 1106 and the new updated expected border 1108. In this particular example, the affected waypoints are P2 and P3. Therefore, the route management module 312 automatically adjusts P2 and P3 based on the updated expected border 1108 to derive the new waypoints P2_New and P3_New. In some embodiments, the interception points between the new updated expected border 1108 and the lines (e.g., not line segments) of the flight segments associated with the affected waypoints are identified. These interception points are then set as the new waypoints. Then the aerial vehicle follows the new flight path 1110.

The route management module 312 can then provide the new waypoints (i.e., points included in the updated flight path) to the navigation and guidance control of the aerial vehicle so that the aerial vehicle can fly according to P1, P2_New, P3_New, and P4 instead of the original path of P1, P2, P3, and P4. Thereby, the aerial vehicle automatically and more accurately reaches the actual border location without exceeding it, and the fertilizer/pesticide application covers the whole field without overspill to areas outside of the field.

The borders shown in FIGS. 11A and 11B are borders that can potentially cross the direction of travel of the aerial vehicle (e.g., borders that the aerial vehicle is travelling towards). Such a border may be referred to as an end border. The aerial vehicle may be flying along a border, and such a border may be referred to as a side border. Take the exemplary field shown in FIG. 2, when the aerial vehicle is following the flight path that is parallel and adjacent to the border defined by vertices $V_1$ and $V_2$, this border can be identified as a side border. The determination of whether a border is an end border or a side border for a flight segment can be provided by the route management module 312 as a property of the border to be identified. When the aerial vehicle is flying along a side border, the side border is likely always present in the image captured by a camera of the aerial vehicle. As a result, not all portions in the image can be used for learning features of the area inside the boundary and using a measure of the distance to the border is not applicable for the decision of activating the learning process or the detection process.

In some embodiments, a determination is made as to whether a border in an image is an end border or a side border as a property of the border to be identified by examining the relationship between the associated flight segment and the border (e.g., direction of travel compared to direction of border). For example, if the current flight path segment is adjacent to the border and is substantially parallel to the border, the border is identified as a side border when the aerial vehicle is following this respective flight segment. If the current flight path segment intercepts with the border and the flight direction is towards the border, the border is identified as an end border when the aerial vehicle is following this respective flight segment. The border estimation module 310 may further provide this property to the border identification module 308 along with the expected border location. The border identification module 308 may incorporate this border property to identify the border accordingly.

Figure 12:
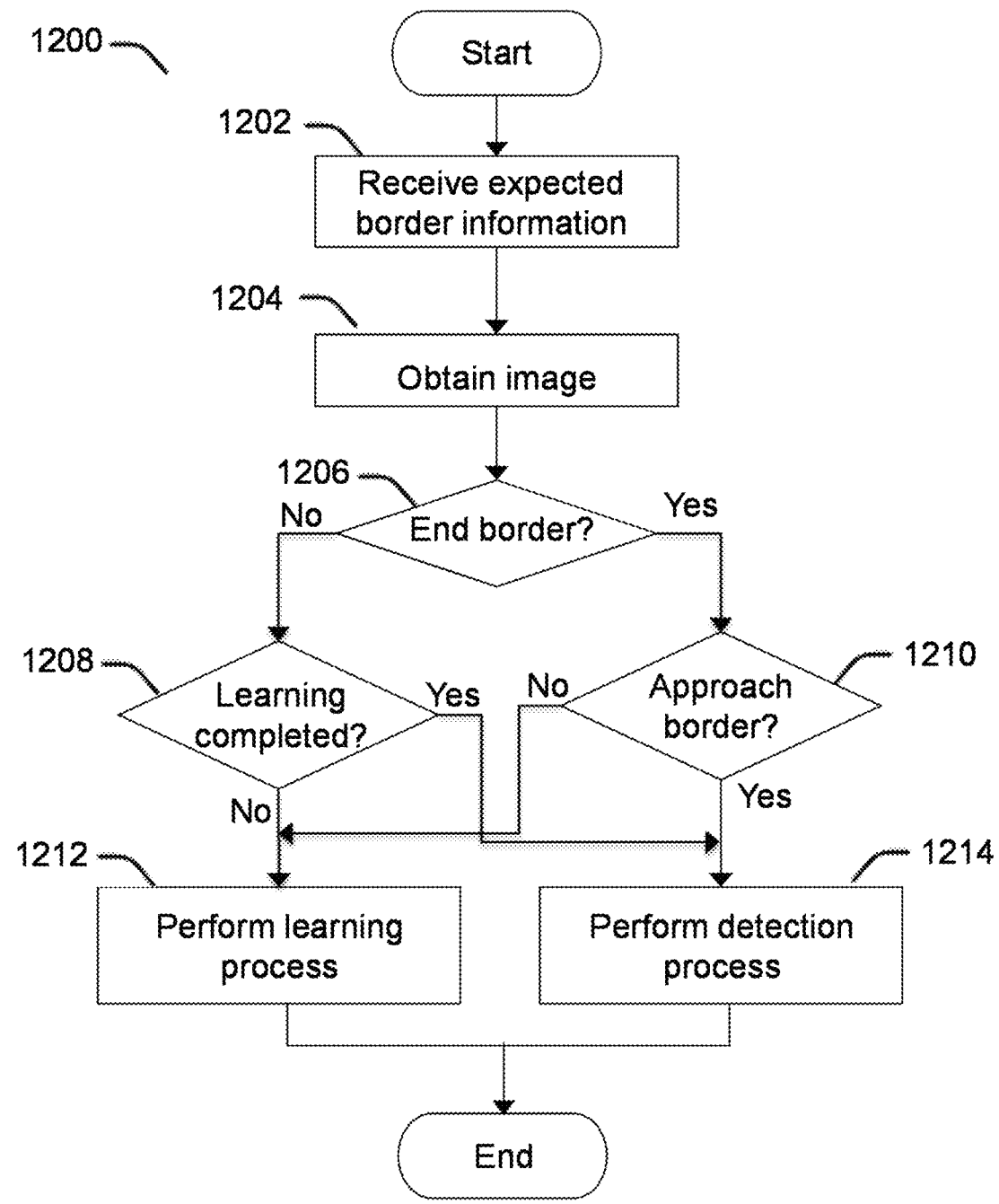
FIG. 12 is a flowchart illustrating an embodiment of a process for learning and detection of a border based on a detected type of border.

FIG. 12 is a flowchart illustrating an embodiment of a process for learning and detection of a border based on a detected type of border. The process of FIG. 12 may be at least in part implemented on on-board system 104 of FIG. 1 and/or processor 314 of FIG. 3. For example, the border identification module 308 identifies both types of borders: side borders and end borders. In some aspects, the identification process 1200 is similar to the identification process 400 shown in FIG. 4. For example, steps 1202 and 1204 correspond to steps 402 and 404.

At 1202, the expected border information is received. For example, geographical coordinates of vertices of a polygon outlining a bounded flight/application area are received (e.g., from the border estimation module 310). For example, an outline of a field where an aerial vehicle is to spray a chemical is specified by a user on an overhead satellite map image of the field via touch inputs on a touch screen (e.g., touch screen of field mobile station 102) showing the satellite map image, where the locations of the touch inputs correspond to locations of vertices of the polygon outlining the initial expected borders of a field. The geographical coordinates corresponding to these touch input provided locations are received in this example. In some embodiments, the expected border location information includes location information regarding the edge of the polygon outlining the bounded flight/application area. In some embodiments, the expected border location information was at least in part updated during a previous iteration of process 1200 (e.g., updated during previous flight). For example, the expected border location information is updated in the border detection process of 1214.

At 1204, an image is obtained. For example, the imaging device 302 continually captures images as the aerial vehicle is in flight and an image captured by imaging device 302 is received.

At 1206, it is determined whether a border property that indicates a border, if any, captured in the image, is an end border or a side border. If the border is a side border, the process proceeds to 1208 where it is determined if a learning process has been completed. If the learning process is not completed, the process proceeds to 1212 to perform the learning process (e.g., to build statistical model of the field). Once the learning process has been completed, a flag will be set to indicate that the learning process has been completed. If in 1208 it is determined that the learning process has been completed, the process proceeds to 1214 to execute the detection process. If the border is an end border, the process 1200 proceeds from 1206 to 1210 to determine whether the aerial vehicle is within a threshold distance from the border (e.g., determine if the aerial vehicle is far away from the border or is approaching the border as described in 406 in FIG. 4). If the aerial vehicle is greater than the threshold distance away from the border, the process 1200 continues to 1212 to perform the learning process; otherwise, it continues to 1214 to execute the detection process.

Figure 13:
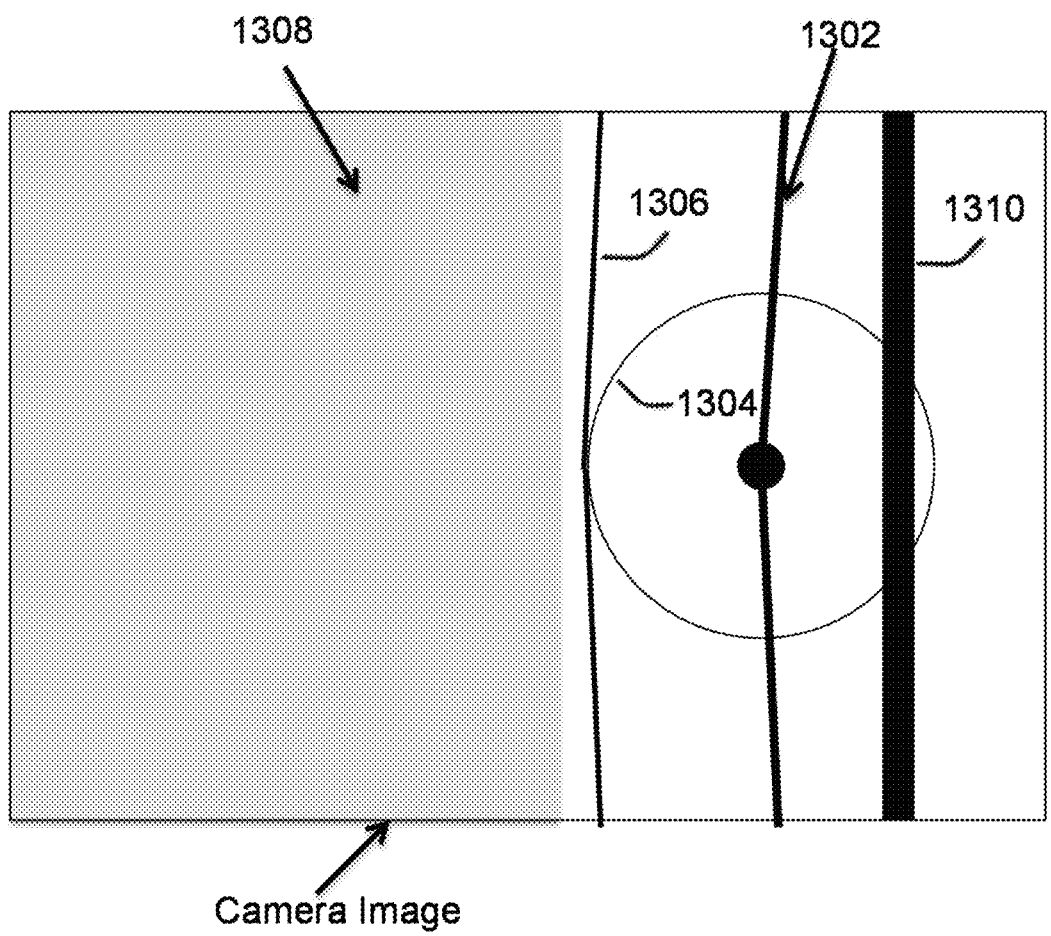
FIG. 13 is a diagram illustrating an example of how the learning process identifies the crop area.

An example of the learning process in step 1212 is described and shown along with the examples of FIGS. 5A, 5B, and 5C. However, when the border is identified as a side border, the obtained image of the learning process contains not only the area within the bounded area (e.g., image of the field) but also the border and possibly areas beyond the border. The learning process identifies the areas that correspond to the area within the bounded area and uses only the portion of the image within the bounded area for building the model of the bounded area. For example, FIG. 13 is a diagram illustrating an example of how the learning process identifies the crop area. Therefore, when the border is identified as a side border, performing the learning process may include an extra step to identify the portion of the obtained image corresponding to the area within the bounded area (e.g., when the border is an end border, the area within the bounded area is the entire image area).

The learning process first projects the expected border location from the border estimation module 310 onto the image. In some embodiments, the uncertainty of the expected border location is also projected onto the image. As shown in FIG. 13, the circled area 1304 is the projected uncertainty around the projected expected border 1302. The actual border is shown as line 1310. Accordingly, the uncertainty area 1304 and the projected expected border 1302 can be used to generate the boundary 1306 of a border area that encompasses the projected uncertainty area, the expected border location, and the area that is at the outer side of the expected border location. The portion of the image in this border area is excluded in the learning process of this example. The area that is away from this border area is identified as the crop area 1308, and the learning process then uses features of the portion of the image in the crop area 1308 to build the statistical model of the bounded area. Once the statistical model has been built with a pre-defined confidence level, the learning process is completed for the side border.

Figure 14:
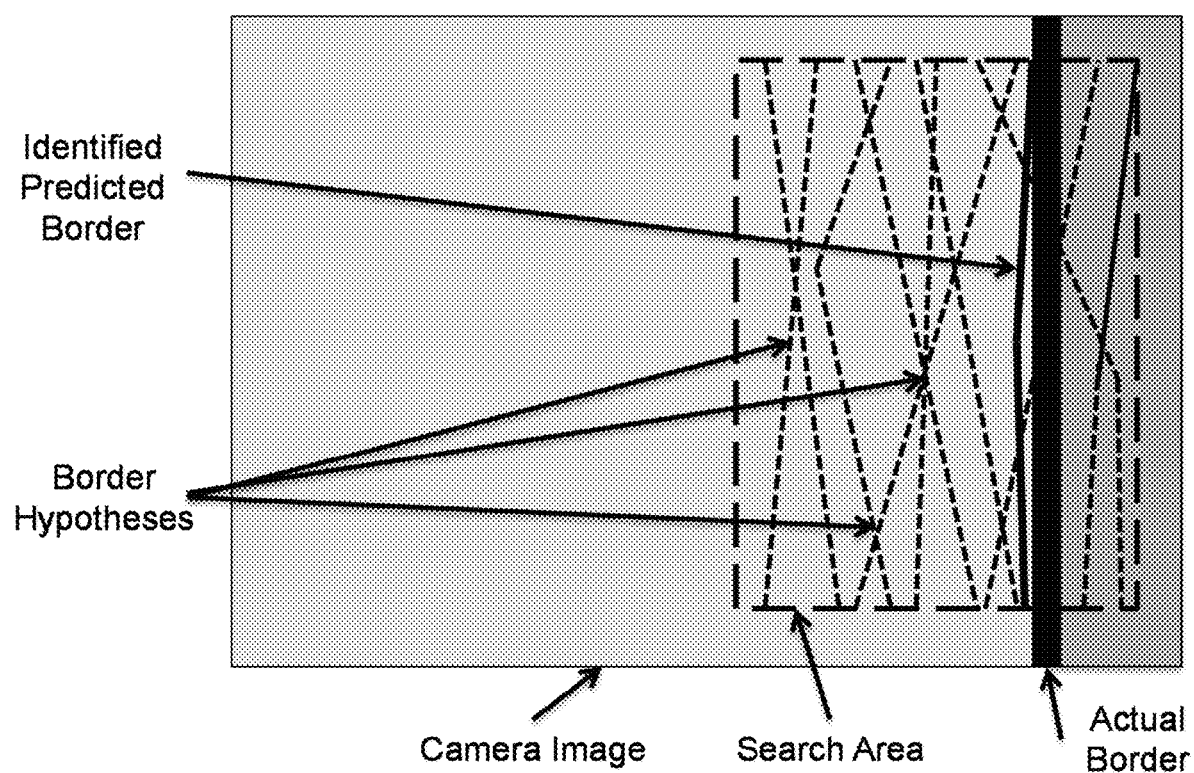
FIG. 14 is a diagram illustrating an example of the search area and the border hypotheses.

In some embodiments, the detection process 1214 of FIG. 12 is one or more steps in the process of FIG. 6. For example, the expected border location is projected onto the image and border hypotheses are generated. FIG. 14 is a diagram illustrating an example of the search area and the border hypotheses. Performing the detection process 1214 may include evaluating the border hypothesis using the learned model, identifying the border, and converting the identified border back to vehicle-fixed coordinates before outputting it to the border estimation module 310. The border estimation module 310 may then integrate the identified border to provide a more accurate border estimate using the process shown in FIG. 10 and the route management module 312 may further update the flight path to keep the aerial vehicle within but close to the side border to achieve a more accurate and complete coverage of the bounded area.

In the embodiments described, the border identification module 308 conducts either the learning process or the detection process in each cycle. In some embodiments, (e.g., especially when the border to be identified is a side border), the identification module 308 may conduct both the learning process and the detection process in one cycle. That is, after the learning is completed, the border identification process still goes to step 1212 to conduct the learning process and then goes to step 1214 to use the learned model for detection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an aerial vehicle, comprising:
    an image sensor;
    a location sensor configured to detect a first current location position of the aerial vehicle at a first instance and detect a second current location position of the aerial vehicle at a second instance; and
    a processor configured to:
        receive a specification of an expected border of a bounded area;
        receive a first image captured by the image sensor while the aerial vehicle is in flight associated with the first current location position;
        use the first current location position of the aerial vehicle to determine whether the aerial vehicle is within a threshold distance away from the expected border while the aerial vehicle is in flight;
        in response to determining based on the first current location position that the aerial vehicle is not within the threshold distance away from the expected border use at least the first image captured by the image sensor in real time while the aerial vehicle is in flight to generate a model of learned features representative of the bounded area;
        receive a second image captured by the image sensor while the aerial vehicle is in flight associated with the second current location position;
        use the second current location position of the aerial vehicle to determine whether the aerial vehicle is within the threshold distance away from the expected border while the aerial vehicle is in flight; and
        in response to determining based on the second current location position that the aerial vehicle is within the threshold distance away from the expected border and while the aerial vehicle is in flight:
            project the expected border to the second image captured by the image sensor in real time,
            use the projected expected border, the model of learned features representative of the bounded area, and at least the second image to detect a predicted border portion, and
            use the predicted border portion to update and correct the expected border.

2. The system of claim 1, wherein the processor is further configured to use the updated expected border in navigating the aerial vehicle.

3. The system of claim 1, wherein updating and correcting the expected border includes determining a plurality of border hypotheses and evaluating each border hypothesis of the border hypotheses using the model to select one border hypothesis of the border hypotheses as a selected border hypothesis.

4. The system of claim 3, wherein updating and correcting the expected border includes combining the selected border hypothesis with the expected border to generate the updated expected border.

5. The system of claim 3, wherein the plurality of border hypotheses are at least in part determined randomly.

6. The system of claim 3, wherein evaluating each border hypothesis includes, for each border hypothesis, evaluating a first portion of the second image on a first side of a corresponding border hypothesis using the model of the bounded area and evaluating a second portion of the second image on a second side of the corresponding border hypothesis using the model of the bounded area.

7. The system of claim 3, wherein selecting the selected border hypothesis includes determining a measure of confidence for the selected border hypothesis and determining that the measure of confidence is greater than a threshold confidence value.

8. The system of claim 1, wherein the specification of the expected border of the bounded area was specified at least in part by a user specified vertex point of a polygon.

9. The system of claim 1, wherein the bounded area includes an agricultural field.

10. The system of claim 1, wherein the generating the model of the bounded area includes analyzing visual characteristics of at least the first image of at least the portion of the bounded area to statistically analyze characteristics of the bounded area.

11. The system of claim 1, wherein the model of the bounded area is at least in part generated using machine learning performed by the processor of the aerial vehicle.

12. The system of claim 1, wherein the model of the bounded area was at least in part pre-trained using a base training data.

13. The system of claim 1, wherein generating the model of the bounded area includes updating the model that has been previously trained during a previous flight session of the aerial vehicle.

14. The system of claim 1, wherein updating and correcting the expected border includes analyzing a selected search area within the second image and the search area corresponds to an uncertainty of the expected border.

15. The system of claim 1, wherein the processor is further configured to use the updated expected border in modifying a waypoint of a flight path of the aerial vehicle.

16. The system of claim 1, wherein the aerial vehicle includes a sprayer and an application of a chemical on the bounded area using the sprayer is controlled using the updated expected border.

17. The system of claim 1, wherein the processor is further configured to detect whether the portion of the expected border captured in the second image is a side border or an end border.

18. The system of claim 1, wherein the model of the bounded area was generated at least in part by identifying a side border of the expected border in a third image and modeling only a portion of the third image identified as belonging to a bounded area side of the side border.

19. A method, comprising:
    receiving a specification of an expected border of a bounded area;
    receiving a first image captured by an image sensor of an aerial vehicle while the aerial vehicle is in flight associated with a first current location position detected by a location sensor of the aerial vehicle at a first instance;
    using the first current location position of an aerial vehicle to determine whether the aerial vehicle is within a threshold distance away from the expected border while the aerial vehicle is in flight;
    in response to determining based on the first current location position that the aerial vehicle is not within the threshold distance away from the expected border using at least the first image captured by the image sensor in real time while the aerial vehicle is in flight to generate a model of learned features representative of the bounded area;

receiving a second image captured by the image sensor while the aerial vehicle is in flight associated with a second current location position detected by the location sensor of the aerial vehicle at a second instance;

using the second current location position of the aerial vehicle to determine whether the aerial vehicle is within the threshold distance away from the expected border while the aerial vehicle is in flight; and in response to determining based on the second current location position that the aerial vehicle is within the threshold distance away from the expected border and while the aerial vehicle is in flight:

projecting the expected border to the second image captured by the image sensor in real time, using the projected expected border, the model of learned features representative of the bounded area, and at least the second image to detect a predicted border portion, and using the predicted border portion to update and correct the expected border.

20. A computer program product, the computer program product being embodied in a non-transitory computer readable storage medium and comprising computer instructions for:

receiving a specification of an expected border of a bounded area;

receiving a first image captured by an image sensor of an aerial vehicle while the aerial vehicle is in flight associated with a first current location position detected by a location sensor of the aerial vehicle at a first instance;

using the first current location position of an aerial vehicle to determine whether the aerial vehicle is within a threshold distance away from the expected border while the aerial vehicle is in flight;

in response to determining based on the first current location position that the aerial vehicle is not within the threshold distance away from the expected border using at least the first image captured by the image sensor in real time while the aerial vehicle is in flight to generate a model of learned features representative of the bounded area;

receiving a second image captured by the image sensor while the aerial vehicle is in flight associated with a second current location position detected by the location sensor of the aerial vehicle at a second instance;

using the second current location position of the aerial vehicle to determine whether the aerial vehicle is within the threshold distance away from the expected border while the aerial vehicle is in flight; and in response to determining based on the second current location position that the aerial vehicle is within the threshold distance away from the expected border and while the aerial vehicle is in flight:

projecting the expected border to the second image captured by the image sensor in real time, using the projected expected border, the model of learned features representative of the bounded area, and at least the second image to detect a predicted border portion, and using the predicted border portion to update and correct the expected border.

* * * * *

UNITED STATES PATENT AND TRADEMARK OFFICE
CERTIFICATE OF CORRECTION

PATENT NO. : 10,991,258 B2  
APPLICATION NO. : 15/953254  
DATED : April 27, 2021  
INVENTOR(S) : Jihua Huang, Han-Shue Tan and SweKuang Tan Page 1 of 1

It is certified that error appears in the above-identified patent and that said Letters Patent is hereby corrected as shown below:

On the Title Page

Item (73), assignee, address, insert --China--.

In the Specification

In Column 14, Line(s) 28, after "points", delete "V," and insert --Vi--, therefor.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*